US012513320B2

(12) United States Patent
Skupin et al.

(10) Patent No.: US 12,513,320 B2
(45) Date of Patent: Dec. 30, 2025

(54) HYPOTHETICAL REFERENCE DECODER

(71) Applicant: FRAUNHOFER-GESELLSCHAFT ZUR FÖRDERUNG DER ANGEWANDTEN FORSCHUNG E.V., Munich (DE)

(72) Inventors: Robert Skupin, Berlin (DE); Yago Sánchez De La Fuente, Berlin (DE); Cornelius Hellge, Berlin (DE); Thomas Schierl, Berlin (DE); Karsten Sühring, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/589,704

(22) Filed: Feb. 28, 2024

(65) Prior Publication Data

US 2024/0244240 A1 Jul. 18, 2024

Related U.S. Application Data

(63) Continuation of application No. 17/461,795, filed on Aug. 30, 2021, now Pat. No. 11,936,889, which is a (Continued)

(30) Foreign Application Priority Data

Mar. 1, 2019 (EP) .................................... 19160423

(51) Int. Cl.

*H04N 19/172* (2014.01)

*H04N 19/30* (2014.01)

(Continued)

(52) U.S. Cl.

CPC ......... *H04N 19/423* (2014.11); *H04N 19/172* (2014.11); *H04N 19/30* (2014.11); *H04N 19/46* (2014.11)

(58) Field of Classification Search

CPC .... H04N 19/423; H04N 19/172; H04N 19/30; H04N 19/46; H04N 19/58;

(Continued)

(56) References Cited

U.S. PATENT DOCUMENTS 9,210,430 B2 * 12/2015 Deshpande ............ H04N 19/31
9,237,356 B2 * 1/2016 Wang ..................... H04N 19/58

(Continued)

FOREIGN PATENT DOCUMENTS

| | | |
|---|---|---|
| EP | 2834975 | 2/2015 |
| JP | 2015-533048 | 11/2015 |
| WO | 2014/046850 | 3/2014 |

OTHER PUBLICATIONS

"Video coding standard AVC (Advanced Video Codec): Edition 12.0 of ITU-T H.264" (Apr. 13, 2017): https://www.itu.int/rec/dologin_pub.asp?lang=e&id=T-REC-H.264-201704-S !!PDF-E &type=items, 812 pages.

(Continued)

*Primary Examiner* — Gims S Philippe
(74) *Attorney, Agent, or Firm* — Sage Patent Group

(57) ABSTRACT

A video data stream having a video encoded thereinto and is described. It includes first timing information on first coded picture buffer, CPB, removal times to be applied at decoder side in case of buffering a complete version of the video data stream, and second timing information on second CPB removal times to be applied at decoder side for buffering a reduced version of the video data stream, differing from the video data stream by removal of a portion of the video data stream from the complete version of the video data stream.

(Continued)

Corresponding video encoders, video decoders, network nodes, apparatuses for managing the coded picture buffer, CPB, of a video decoder, and apparatuses for splicing together video data streams are also referred to.

18 Claims, 37 Drawing Sheets

Related U.S. Application Data continuation of application No. PCT/EP2020/055122, filed on Feb. 27, 2020.

(51) Int. Cl.
*H04N 19/423* (2014.01)
*H04N 19/46* (2014.01)

(58) Field of Classification Search
CPC .. H04N 21/23424; H04N 19/31; H04N 19/44; H04N 19/70; H04N 21/2401
See application file for complete search history.

(56) References Cited

U.S. PATENT DOCUMENTS

| | | | | |
|---|---|---|---|---|
| 9,532,067 | B2 * | 12/2016 | Deshpande | H04N 19/50 |
| 9,591,321 | B2 * | 3/2017 | Deshpande | H04N 19/70 |
| 2004/0005007 | A1 | 1/2004 | Viscito et al. | |
| 2013/0266076 | A1 | 10/2013 | Wang | |
| 2014/0086332 | A1 | 3/2014 | Wang | |
| 2014/0086344 | A1 * | 3/2014 | Wang | H04N 19/46 375/240.28 |
| 2014/0169448 | A1 | 6/2014 | Wang | |
| 2014/0301477 | A1 * | 10/2014 | Deshpande | H04N 19/70 375/240.25 |
| 2014/0355692 | A1 * | 12/2014 | Ramasubramonian | H04N 19/597 375/240.26 |
| 2016/0156914 | A1 | 6/2016 | Suehring | |
| 2016/0366428 | A1 | 12/2016 | Deshpande | |
| 2016/0373790 | A1 | 12/2016 | Tsukagoshi | |
| 2019/0014337 | A1 | 1/2019 | Skupin | |
| 2020/0351497 | A1 | 11/2020 | Skupin | |

OTHER PUBLICATIONS

"Video coding standard HEVC (High Efficiency Video Coding): Edition 5.0 of ITU-T H.265" (Feb. 13, 2018): https://www.tu.int/rec/dologin_pub.asp?lang=e&id=T-REC-H.265-201802-S !!PDF-E &type=items, 692 pages.

Sjöberg, R., et al, "HLS: Dependent RAP indication SEI message" 19. JCT-VC Meeting, Oct. 2014; Strasbourg; (Joint Collaborative Team On Video Coding of ISO/IEC JTC1/SC29/WG11 and ITU-T SG.16); URL: HTTP://WFTP3.ITU.INT/AV-ARCH/JCTVC-SITE/, (Oct. 8, 2014), No. JCTVC-S0095, XP030116840 [Y], 4 pages.

Sjöberg, R., et al, "Overview of HEVC high-level syntax and reference picture management" IEEE Transactions On Circuits and Systems for Video Technology, US, (Oct. 5, 2012), vol. 22, No. 12, doi: 10.1109/TCSVT.2012.2223052, ISSN 1051-8215, XP055045360 [A], 14 pages.

* cited by examiner

| pic_timing( payloadSize ) { | Descriptor | |
|---|---|---|
| if( frame_field_info_present_flag ) { | | |
| pic_struct | u(4) | |
| source_scan_type | u(2) | |
| duplicate_flag | u(1) | |
| } | | |
| if( CpbDpbDelaysPresentFlag ) { | | |
| aus_since_rap_removed_flag | u(1) | 32 |
| au_cpb_removal_delay_minus1 | u(v) | |
| init_removal_delay_correction_offset | u(v) | 19, 18 |
| cpb_removal_delay_offset | u(v) | 21 |
| pic_dpb_output_delay | u(v) | |
| if( sub_pic_hrd_params_present_flag ) | | |
| pic_dpb_output_du_delay | u(v) | |
| if( sub_pic_hrd_params_present_flag && sub_pic_cpb_params_in_pic_timing_sei_flag ) { | | |
| num_decoding_units_minus1 | ue(v) | |
| du_common_cpb_removal_delay_flag | u(1) | |
| if( du_common_cpb_removal_delay_flag ) | | |
| du_common_cpb_removal_delay_increment_minus1 | u(v) | |
| for( i = 0; i<=num_decoding_units_minus1; i++ ) { | | |
| num_nalus_in_du_minus1[ i ] | ue(v) | |
| if( !du_common_cpb_removal_delay_flag && i < num_decoding_units_minus1 ) | | |
| du_cpb_removal_delay_increment_minus1[ i ] | u(v) | |
| } | | |
| } | | |
| } | | |
| } | | |

Fig. 8

| pic_timing( payloadSize ) { | Descriptor | |
|---|---|---|
| if( frame_field_info_present_flag ) { | | |
| pic_struct | u(4) | |
| source_scan_type | u(2) | |
| duplicate_flag | u(1) | |
| } | | |
| if( CpbDpbDelaysPresentFlag ) { | | |
| drap_operation_mode_flag | u(1) | 38 |
| au_cpb_removal_delay_minus1 | u(v) | |
| cpb_drap_operation_removal_delay_offset | u(v) | 35' |
| pic_dpb_output_delay | u(v) | |
| if( sub_pic_hrd_params_present_flag ) | | |
| pic_dpb_output_du_delay | u(v) | |
| if( sub_pic_hrd_params_present_flag && sub_pic_cpb_params_in_pic_timing_sei_flag ) { | | |
| num_decoding_units_minus1 | ue(v) | |
| du_common_cpb_removal_delay_flag | u(1) | |
| if( du_common_cpb_removal_delay_flag ) | | |
| du_common_cpb_removal_delay_increment_minus1 | u(v) | |
| for( i = 0; i<=num_decoding_units_minus1; i++ ) { | | |
| num_nalus_in_du_minus1[ i ] | ue(v) | |
| if( !du_common_cpb_removal_delay_flag && i < num_decoding_units_minus1 ) | | |
| du_cpb_removal_delay_increment_minus1[ i ] | u(v) | |
| } | | |
| } | | |
| } | | |
| } | | |

Fig. 10

| buffering_period( payloadSize ) { | Descriptor |
|---|---|
|    bp_seq_parameter_set_id | ue(v) |
|    if( !sub_pic_hrd_params_present_flag ) | |
|       irap_cpb_params_present_flag | u(1) |
|    if( irap_cpb_params_present_flag ) { | |
|       cpb_delay_offset | u(v) |
|       dpb_delay_offset | u(v) |
|    } | |
|    concatenation_flag | u(1) |
|    au_cpb_removal_delay_delta_minus1 | u(v) |
|    cpb_removal_drap_flag | u(1) |
|    if(cpb_removal_drap_flag) { | |
|       drap_operation_initial_removal_delay | u(v) |
|       drap_operation_initial_removal_offset | u(v) |
|    } | |
|    ... | |

| 30 fps | 60 fps | 120 fps | Delta(60,30) | Delta(120,30) or Delta(120,60) |
|---|---|---|---|---|
| NA | NA | 2/120 | NA | NA |
| NA | 1/60 | 1/120 | NA | 1/120 |
| NA | NA | 3/120 | NA | NA |
| 0 | 0 | 0 | 0 | 0 |
| NA | NA | 7/120 | NA | NA |
| NA | 4/60 | 6/120 | NA | 2/120 |
| NA | NA | 8/120 | NA | NA |
| 2/30 | 3/60 | 5/120 | 1/60 | 3/120 |
| NA | NA | 10/120 | NA | NA |
| NA | 5/60 | 9/120 | NA | 1/120 |
| NA | NA | 11/120 | NA | NA |
| 1/30 | 2/60 | 4/120 | 0 | 0 |
| NA | NA | 15/120 | NA | NA |
| NA | 8/60 | 14/120 | NA | 2/120 |
| NA | NA | 16/120 | NA | NA |
| 4/30 | 7/60 | 13/120 | 1/60 | 3/120 |
| NA | NA | 18/120 | NA | NA |
| NA | 9/60 | 17/120 | NA | 1/120 |
| NA | NA | 19/120 | NA | NA |
| 3/30 | 6/60 | 12/120 | 0 | 0 |
| NA | NA | 23/120 | NA | NA |
| NA | 12/60 | 22/120 | NA | 2/120 |
| NA | NA | 24/120 | NA | NA |
| 6/30 | 11/60 | 21/120 | 1/60 | 3/120 |
| NA | NA | 26/120 | NA | NA |
| NA | 13/60 | 25/120 | NA | 1/120 |
| NA | NA | 27/120 | NA | NA |
| 5/30 | 10/60 | 20/120 | 0 | 0 |
| NA | NA | 31/120 | NA | NA |
| NA | 16/60 | 30/120 | NA | 2/120 |
| NA | NA | 32/120 | NA | NA |
| 8/30 | 15/60 | 29/120 | 1/60 | 3/120 |
| NA | NA | 34/120 | NA | NA |
| NA | 17/60 | 33/120 | NA | 1/120 |
| NA | NA | 35/120 | NA | NA |
| 7/30 | 14/60 | 28/120 | 0 | 0 |

| 30 fps | 60 fps | 120 fps | Delta(60,30) | Delta(120,30) or Delta(120,60) |
|---|---|---|---|---|
| 0 | 0 | 0 | 0 | 0 |
| NA | NA | 4/120 | NA | NA |
| NA | 3/60 | 3/120 | NA | 3/120 |
| NA | NA | 5/120 | NA | NA |
| 2/30 | 2/60 | 2/120 | 0 | 0 |
| NA | NA | 7/120 | NA | NA |
| NA | 4/60 | 6/120 | NA | 2/120 |
| NA | NA | 8/120 | NA | NA |
| 1/30 | 1/60 | 1/120 | 1/60 | 3/120 |
| NA | NA | 12/120 | NA | NA |
| NA | 7/60 | 11/120 | NA | 3/120 |
| NA | NA | 13/120 | NA | NA |
| 4/30 | 6/60 | 10/120 | 2/60 | 6/120 |
| NA | NA | 15/120 | NA | NA |
| NA | 8/60 | 14/120 | NA | 2/120 |
| NA | NA | 16/120 | NA | NA |
| 3/30 | 5/60 | 9/120 | 1/60 | 3/120 |
| NA | NA | 20/120 | NA | NA |
| NA | 11/60 | 19/120 | NA | 3/120 |
| NA | NA | 21/120 | NA | NA |
| 6/30 | 10/60 | 18/120 | 2/60 | 6/120 |
| NA | NA | 23/120 | NA | NA |
| NA | 12/60 | 22/120 | NA | 2/120 |
| NA | NA | 24/120 | NA | NA |
| 5/30 | 9/60 | 17/120 | 1/60 | 3/120 |
| NA | NA | 28/120 | NA | NA |
| NA | 15/60 | 27/120 | NA | 3/120 |
| NA | NA | 29/120 | NA | NA |
| 8/30 | 14/60 | 26/120 | 2/60 | 6/120 |
| NA | NA | 31/120 | NA | NA |
| NA | 16/60 | 30/120 | NA | 2/120 |
| NA | NA | 32/120 | NA | NA |
| 7/30 | 13/60 | 25/120 | 1/60 | 3/120 |

| 30 fps | 60 fps | 120 fps | Delta(60,30) | Delta(120,30) or Delta(120,60) |
|---|---|---|---|---|
| 0 | 0 | 0 | 0 | 0 |
| NA | NA | 4/120 | NA | NA |
| NA | 3/60 | 3/120 | NA | 3/120 |
| NA | NA | 5/120 | NA | NA |
| 2/30 | 2/60 | 2/120 | 0 | 0 |
| NA | NA | 7/120 | NA | NA |
| NA | 4/60 | 6/120 | NA | 2/120 |
| NA | NA | 8/120 | NA | NA |
| 1/30 | 1/60 | 1/120 | 1/60 | 3/120 |
| NA | NA | 12/120 | NA | NA |
| NA | 7/60 | 11/120 | NA | 3/120 |
| NA | NA | 13/120 | NA | NA |
| 4/30 | 6/60 | 10/120 | 2/60 | 6/120 |
| NA | NA | 15/120 | NA | NA |
| NA | 8/60 | 14/120 | NA | 2/120 |
| NA | NA | 16/120 | NA | NA |
| 3/30 | 5/60 | 9/120 | 1/60 | 3/120 |
| NA | NA | 18/120 | **NA** | **NA** |
| NA | 9/60 | 17/120 | **NA** | **3/120** |
| NA | NA | 2/120 | **NA** | **NA** |
| 1/30 | 1/60 | 1/120 | **1/60** | **3/120** |
| NA | NA | 4/120 | **NA** | **NA** |
| NA | 2/60 | 3/120 | **NA** | **1/120** |
| NA | NA | 5/120 | **NA** | **NA** |
| 5/30 | 10/60 | 19/120 | 0 | 1/120 |
| NA | NA | 9/120 | NA | NA |
| NA | 5/60 | 8/120 | NA | 2/120 |
| NA | NA | 10/120 | NA | NA |
| 3/30 | 4/60 | 7/120 | 2/60 | 5/120 |
| NA | NA | 12/120 | NA | NA |
| NA | 6/60 | 11/120 | NA | 1/120 |
| NA | NA | 13/120 | NA | NA |
| 2/30 | 3/60 | 6/120 | 1/60 | 2/120 |
| NA | NA | 17/120 | NA | NA |
| NA | 9/60 | 16/120 | NA | 2/120 |
| NA | NA | 18/120 | NA | NA |
| 5/30 | 8/60 | 15/120 | 2/60 | 5/120 |
| NA | NA | 20/120 | NA | NA |
| NA | 10/60 | 19/120 | NA | 1/120 |
| NA | NA | 21/120 | NA | NA |
| 4/30 | 7/60 | 14/120 | 1/60 | 2/120 |

Fig. 19

| pic_timing( payloadSize ) { | Descriptor |
|---|---|
| if( frame_field_info_present_flag ) { | |
| pic_struct | u(4) |
| source_scan_type | u(2) |
| duplicate_flag | u(1) |
| } | |
| if( CpbDpbDelaysPresentFlag ) { | |
| au_cpb_removal_delay_per_sub_layer | u(1) |
| if( !au_cpb_removal_delay_per_sub_layer ) | |
| au_cpb_removal_delay_minus1 | u(v) |
| else { | |
| num_sub_layer_cpb_removal_delays_minus1 | ue(v) |
| for( i = 0; i <= m_sub_layer_cpb_removal_delays_minus1; i++ ) { | |
| au_cpb_removal_delay_minus1[ i ] | u(v) |
| } | |
| } | |
| pic_dpb_output_delay | u(v) |
| if( sub_pic_hrd_params_present_flag ) | |
| pic_dpb_output_du_delay | u(v) |
| if( sub_pic_hrd_params_present_flag && sub_pic_cpb_params_in_pic_timing_sei_flag ) { | |
| num_decoding_units_minus1 | ue(v) |
| du_common_cpb_removal_delay_flag | u(1) |
| if( du_common_cpb_removal_delay_flag ) | |
| du_common_cpb_removal_delay_increment_minus1 | u(v) |
| for( i = 0; i <= num_decoding_units_minus1; i++ ) { | |
| num_nalus_in_du_minus1[ i ] | ue(v) |
| if( !du_common_cpb_removal_delay_flag && i < num_decoding_units_minus1 ) | |
| du_cpb_removal_delay_increment_minus1[ i ] | u(v) |
| } | |
| } | |
| } | |
| } | |

Fig. 20

| buffering_period( payloadSize ) { | Descriptor |
|---|---|
| bp_seq_parameter_set_id | ue(v) |
| if( !sub_pic_hrd_params_present_flag ) | |
| irap_cpb_params_present_flag | u(1) |
| if( irap_cpb_params_present_flag ) { | |
| cpb_delay_offset | u(v) |
| dpb_delay_offset | u(v) |
| } | |
| concatenation_flag | u(1) |
| au_cpb_removal_delay_delta_minus1 | u(v) |
| au_cpb_removal_offset_pattern_present_flag | u(1) |
| if( au_cpb_removal_offset_pattern_present_flag ) { | |
| num_cpb_removal_offsets_minus1 | ue(v) |
| for( i = 0; i <= num_cpb_removal_offsets_minus1 ; i++ ) | |
| au_cpb_removal_pattern_offset[ i ] | u(v) |
| } | |
| if( NalHrdBpPresentFlag ) { | |
| for( i = 0; i < CpbCnt; i++ ) { | |
| nal_initial_cpb_removal_delay[ i ] | u(v) |
| nal_initial_cpb_removal_offset[ i ] | u(v) |
| if( sub_pic_hrd_params_present_flag \| \| irap_cpb_params_present_flag ) { | |
| nal_initial_alt_cpb_removal_delay[ i ] | u(v) |
| nal_initial_alt_cpb_removal_offset[ i ] | u(v) |
| } | |
| } | |
| } | |
| if( VclHrdBpPresentFlag ) { | |
| for( i = 0; i < CpbCnt; i++ ) { | |
| vcl_initial_cpb_removal_delay[ i ] | u(v) |
| vcl_initial_cpb_removal_offset[ i ] | u(v) |
| if( sub_pic_hrd_params_present_flag \| \| irap_cpb_params_present_flag ) { | |
| vcl_initial_alt_cpb_removal_delay[ i ] | u(v) |
| vcl_initial_alt_cpb_removal_offset[ i ] | u(v) |
| } | |
| } | |
| } | |
| if( payload_extension_present( ) ) | |
| use_alt_cpb_params_flag | u(1) |
| } | |

| pic_timing( payloadSize ) { | Descriptor |
|---|---|
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_per_sub_layer | u(1) |
|     if( au_cpb_removal_delay_per_sub_layer ) | |
|       buffering_period_pattern_flag | u(1) |
|     if( !au_cpb_removal_delay_per_sub_layer || buffering_period_pattern_flag ) | |
|       au_cpb_removal_delay_minus1 | u(v) |
|     if( au_cpb_removal_delay_per_sub_layer) | |
|       num_sub_layer_cpb_removal_delays_minus1 | ue(v) |
|     for( i = 0; i < num_sub_layer_cpb_removal_delays_minus1 + buffering_period_pattern_flag?0:1 ; i++ ) { | |
|       if( buffering_period_pattern_flag ) | |
|         au_cpb_removal_pattern[ i ] | u(v) |
|       else | |
|         au_cpb_removal_delay_minus1[ i ] | u(v) |
|     } | |
|   } | |
|   pic_dpb_output_delay | u(v) |
|   if( sub_pic_hrd_params_present_flag ) | |
|     pic_dpb_output_du_delay | u(v) |
|   if( sub_pic_hrd_params_present_flag && sub_pic_cpb_params_in_pic_timing_sei_flag ) { | |
|     num_decoding_units_minus1 | ue(v) |
|     du_common_cpb_removal_delay_flag | u(1) |
|     if( du_common_cpb_removal_delay_flag ) | |
|       du_common_cpb_removal_delay_increment_minus1 | u(v) |
|     for( i = 0; i <= num_decoding_units_minus1; i++ ) { | |
|       num_nalus_in_du_minus1[ i ] | ue(v) |
|       if( !du_common_cpb_removal_delay_flag && i < num_decoding_units_minus1 ) | |
|         du_cpb_removal_delay_increment_minus1[ i ] | u(v) |
|     } | |
|   } | |
|   } | |
| } | |

Fig. 22

| | |
|---|---|
| vcl_initial_cpb_removal_delay[ i ] | u(v) |
| vcl_initial_cpb_removal_offset[ i ] | u(v) |

Fig. 23

| hrd_parameters( commonInfPresentFlag, maxNumSubLayersMinus1 ) { | Descriptor |
|---|---|
| ... | |
|   for( i = 0; i <= maxNumSubLayersMinus1; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else | |
|       low_delay_hrd_flag[ i ] | u(1) |
|     if( !low_delay_hrd_flag[ i ] ) | |
|       cpb_cnt_minus1[ i ] | ue(v) |
|     if( nal_hrd_parameters_present_flag ) { | |
|       cbr_parameters_present_flag[ i ] | u(1) |
|       if(cbr_parameters_present_flag[ i ]) | |
|         sub_layer_hrd_parameters( i ) | |
|       vbr_min_parameter_present_flag[ i ] | u(1) |
|       if(vbr_min_parameter_present_flag[ i ]) | |
|         sub_layer_hrd_parameters( i ) | |
|       vbr_max_parameter_present_flag[ i ] | u(1) |
|       if(vbr_max_parameter_present_flag[ i ]) | |
|         sub_layer_hrd_parameters( i ) | |
|     } | |
|     if( vcl_hrd_parameters_present_flag ) { | |
|     //similar as for nal_hrd_parameters | |
|     } | |
|   } | |
| } | |

Fig. 24A

| buffering_period( payloadSize ) { | Descriptor | |
|---|---|---|
| bp_seq_parameter_set_id | ue(v) | |
| if( !sub_pic_hrd_params_present_flag ) | | |
| irap_cpb_params_present_flag | u(1) | |
| if( irap_cpb_params_present_flag ) { | | |
| cpb_delay_offset | u(v) | |
| dpb_delay_offset | u(v) | |
| } | | |
| concatenation_flag | u(1) | |
| au_cpb_removal_delay_delta_minus1 | u(v) | |
| if( NalHrdBpPresentFlag ) { | | |
| if(cbr_parameters_present_flag[ i ]) { | | |
| nal_initial_cpb_removal_delay[ i ] | u(v) | 76 |
| nal_initial_cpb_removal_offset[ i ] | u(v) | |
| } | | |
| if(vbr_min_parameter_present_flag[ i ]) { | | |
| nal_initial_cpb_removal_delay[ i ] | | 70 |
| nal_initial_cpb_removal_offset[ i ] | | |
| } | | |
| if(vbr_max_parameter_present_flag[ i ]) { | | |
| nal_initial_cpb_removal_delay[ i ] | | 72 |
| nal_initial_cpb_removal_offset[ i ] | | |
| } | | |
| } | | |
| } | | |
| if( VclHrdBpPresentFlag ) { | | |
| //similar as for nal_hrd_parameters | | |
| } | | |
| if( payload_extension_present( ) ) | | |
| use_alt_cpb_params_flag | u(1) | |
| } | | |

Fig. 24B

| pic_timing( payloadSize ) { | Descriptor |
|---|---|
| ... | |
| if( CpbDpbDelaysPresentFlag ) { | |
| spliceable_flag | u(1) |
| au_cpb_removal_delay_minus1 | u(v) |
| pic_dpb_output_delay | u(v) |
| if( sub_pic_hrd_params_present_flag ) | |
| pic_dpb_output_du_delay | u(v) |
| if( sub_pic_hrd_params_present_flag && sub_pic_cpb_params_in_pic_timing_sei_flag ) { | |
| num_decoding_units_minus1 | ue(v) |
| du_common_cpb_removal_delay_flag | u(1) |
| if( du_common_cpb_removal_delay_flag ) | |
| du_common_cpb_removal_delay_increment_minus1 | u(v) |
| for( i = 0; i <= num_decoding_units_minus1; i++ ) { | |
| num_nalus_in_du_minus1[ i ] | ue(v) |
| if( !du_common_cpb_removal_delay_flag && i < num_decoding_units_minus1 ) | |
| du_cpb_removal_delay_increment_minus1[ i ] | u(v) |
| } | |
| } | |
| } | |
| } | |

| pic_timing( payloadSize ) { | Descriptor |
|---|---|
| ... | |
| if( CpbDpbDelaysPresentFlag ) { | |
| following_pic_spliceable_flag | u(1) |
| au_cpb_removal_delay_minus1 | u(v) |
| pic_dpb_output_delay | u(v) |
| if( sub_pic_hrd_params_present_flag ) | |
| pic_dpb_output_du_delay | u(v) |
| if( sub_pic_hrd_params_present_flag && sub_pic_cpb_params_in_pic_timing_sei_flag ) { | |
| num_decoding_units_minus1 | ue(v) |
| du_common_cpb_removal_delay_flag | u(1) |
| if( du_common_cpb_removal_delay_flag ) | |
| du_common_cpb_removal_delay_increment_minus1 | u(v) |
| for( i = 0; i <= num_decoding_units_minus1; i++ ) { | |
| num_nalus_in_du_minus1[ i ] | ue(v) |
| if( !du_common_cpb_removal_delay_flag && i < num_decoding_units_minus1 ) | |
| du_cpb_removal_delay_increment_minus1[ i ] | u(v) |
| } | |
| } | |
| } | |
| } | |

| buffering_period( payloadSize ) { | Descriptor | |
|---|---|---|
| bp_seq_parameter_set_id | ue(v) | |
| if( !sub_pic_hrd_params_present_flag ) | | |
| irap_cpb_params_present_flag | u(1) | |
| if( irap_cpb_params_present_flag ) { | | |
| cpb_delay_offset | u(v) | |
| dpb_delay_offset | u(v) | |
| } | | |
| concatenation_flag | u(1) | 96 |
| au_cpb_removal_delay_delta_minus1 | u(v) | 98 |
| max_val_initial_removal_delay_for_seamless_splicing | u(v) | 99 |
| ... | | |

Fig. 28

| hrd_parameters( commonInfPresentFlag, maxNumSubLayersMinus1 ) { | Descriptor |
|---|---|
| … | |
| for( i = 0; i <= maxNumSubLayersMinus1; i++ ) { | |
| **fixed_pic_rate_general_flag[ i ]** | u(1) |
| if( !fixed_pic_rate_general_flag[ i ] ) | |
| **fixed_pic_rate_within_cvs_flag[ i ]** | u(1) |
| if( fixed_pic_rate_within_cvs_flag[ i ] ) | |
| **elemental_duration_in_tc_minus1[ i ]** | ue(v) |
| else | |
| **low_delay_hrd_flag[ i ]** | u(1) |
| ~~if( !low_delay_hrd_flag[ i ] )~~ | |
| ~~**cpb_cnt_minus1[ i ]**~~ | ~~ue(v)~~ |
| if( nal_hrd_parameters_present_flag ) { | |
| **cbr_parameters_present_flag[ i ]** | u(1) |
| if(cbr_parameters_present_flag[ i ]) | |
| sub_layer_hrd_parameters( i ) ← 100 | |
| **vbr_min_parameter_present_flag[ i ]** | u(1) |
| if(vbr_min_parameter_present_flag[ i ]) | |
| sub_layer_hrd_parameters( i ) ← 100 } 70a | |
| **vbr_max_parameter_present_flag[ i ]** | u(1) |
| if(vbr_max_parameter_present_flag[ i ]) | |
| sub_layer_hrd_parameters( i ) ← 100 } 72a | |
| } | |
| if( vcl_hrd_parameters_present_flag ) { | |
| //similar as for nal_hrd_parameters | |
| } | |
| } | |
| } | |

| sub_layer_hrd_parameters( subLayerId ) { | Descriptor |
|---|---|
| ~~for( i = 0; i < CpbCnt; i++ ) {~~ | |
| bit_rate_value_minus1[ i ] (104) | ue(v) |
| cpb_size_value_minus1[ i ] (106) | ue(v) |
| if( sub_pic_hrd_params_present_flag ) { | |
| cpb_size_du_value_minus1[ i ] | ue(v) |
| bit_rate_du_value_minus1[ i ] | ue(v) |
| } | |
| ~~cbr_flag[ i ]~~ | ~~u(1)~~ |
| ~~}~~ | |
| } | |

Fig. 30

| buffering_period( payloadSize ) { | Descriptor |
|---|---|
| bp_seq_parameter_set_id | ue(v) |
| if( !sub_pic_hrd_params_present_flag ) | |
| irap_cpb_params_present_flag | u(1) |
| if( irap_cpb_params_present_flag ) { | |
| cpb_delay_offset | u(v) |
| dpb_delay_offset | u(v) |
| } | |
| concatenation_flag | u(1) |
| au_cpb_removal_delay_delta_minus1 | u(v) |
| if( NalHrdBpPresentFlag ) { | |
| if(cbr_parameters_present_flag[ i ]) { | |
| nal_initial_cpb_removal_delay[ i ] | u(v) |
| nal_initial_cpb_removal_offset[ i ] | u(v) |
| } | |
| if(vbr_min_parameter_present_flag[ i ]) { | |
| nal_initial_cpb_removal_delay[ i ] ← 108 (70b) | u(v) |
| nal_initial_cpb_removal_offset[ i ] ← 110 (70b) | u(v) |
| } | |
| if(vbr_max_parameter_present_flag[ i ]) { | |
| nal_initial_cpb_removal_delay[ i ] ← 108 (72b) | u(v) |
| nal_initial_cpb_removal_offset[ i ] ← 110 (72b) | u(v) |
| } | |
| } | |
| if( VclHrdBpPresentFlag ) { | |
| //similar as for nal_hrd_parameters | |
| } | |
| if( payload_extension_present( ) ) | |
| use_alt_cpb_params_flag | |
| } | |

Fig. 31 u(1)

| hrd_parameters( commonInfPresentFlag, maxNumSubLayersMinus1 ) { | Descriptor |
|---|---|
| ... | |
| for( i = 0; i <= maxNumSubLayersMinus1; i++ ) { | |
| fixed_pic_rate_general_flag[ i ] | u(1) |
| if( !fixed_pic_rate_general_flag[ i ] ) | |
| fixed_pic_rate_within_cvs_flag[ i ] | u(1) |
| if( fixed_pic_rate_within_cvs_flag[ i ] ) | |
| elemental_duration_in_tc_minus1[ i ] | ue(v) |
| else | |
| low_delay_hrd_flag[ i ] | u(1) |
| if( !low_delay_hrd_flag[ i ] ) 74 | |
| hrd_interpolation_mode_flag[ i ] | u(1) |
| if( HrdInterpolationModeFlag ) | |
| cpb_cnt_minus1[ i ] | ue(v) |
| } | |
| if( HrdInterpolationModeFlag ) { | |
| if( nal_hrd_parameters_present_flag ) { | |
| cbr_parameters_present_flag[ i ] | u(1) |
| if(cbr_parameters_present_flag[ i ]) 102 | |
| sub_layer_hrd_parameters( i, false ) | |
| vbr_min_parameter_present_flag[ i ] | u(1) |
| if(vbr_min_parameter_present_flag[ i ]) 102 | |
| sub_layer_hrd_parameters( i, false ) 70a' | |
| vbr_max_parameter_present_flag[ i ] | u(1) |
| if(vbr_max_parameter_present_flag[ i ]) 102 | |
| sub_layer_hrd_parameters( i, false ) 70b' | |
| } | |
| }else{ | |
| if( nal_hrd_parameters_present_flag ) { 102 | |
| sub_layer_hrd_parameters( i, true ) 76 | |
| if( vcl_hrd_parameters_present_flag ) { 102 | |
| sub_layer_hrd_parameters( i, true ) | |
| } | |
| } | |
| } | |

| sub_layer_hrd_parameters( subLayerId ,multiCpbPresent) { | Descriptor |
|---|---|
| ~~if (multiCpbPresent) {~~ | |
| for( i = 0; i < CpbCnt; i++ ) { | |
| bit_rate_value_minus1[ i ] | ue(v) |
| cpb_size_value_minus1[ i ] | ue(v) |
| if( sub_pic_hrd_params_present_flag ) { | |
| cpb_size_du_value_minus1[ i ] | ue(v) |
| bit_rate_du_value_minus1[ i ] | ue(v) |
| } | |
| cbr_flag[ i ] | u(1) |
| } | |
| ~~}else{~~ | |
| ~~bit_rate_value_minus1~~ | ~~ue(v)~~ |
| ~~cpb_size_value_minus1~~ | ~~ue(v)~~ |
| ~~if( sub_pic_hrd_params_present_flag ) {~~ | |
| ~~cpb_size_du_value_minus1~~ | ~~ue(v)~~ |
| ~~bit_rate_du_value_minus1~~ | ~~ue(v)~~ |
| ~~}~~ | |
| ~~cbr_flag~~ | ~~u(1)~~ |
| ~~}~~ | |
| } | |

Fig. 33

| buffering_period( payloadSize ) { | Descriptor |
|---|---|
| bp_seq_parameter_set_id | ue(v) |
| if( !sub_pic_hrd_params_present_flag ) | |
| irap_cpb_params_present_flag | u(1) |
| if( irap_cpb_params_present_flag ) { | |
| cpb_delay_offset | u(v) |
| dpb_delay_offset | u(v) |
| } | |
| concatenation_flag | u(1) |
| au_cpb_removal_delay_delta_minus1 | u(v) |
| if( NalHrdBpPresentFlag ) { | |
| ~~if( HrdInterpolationModeFlag ) {~~ | |
| ~~if(cbr_parameters_present_flag[ i ]) {~~ | |
| nal_initial_cpb_removal_delay[ i ] | u(v) |
| nal_initial_cpb_removal_offset[ i ] | u(v) |
| } | |
| ~~if(vbr_min_parameter_present_flag[ i ]) {~~ 70b' | |
| nal_initial_cpb_removal_delay[ i ] | u(v) |
| nal_initial_cpb_removal_offset[ i ] | u(v) |
| } | |
| ~~if(vbr_max_parameter_present_flag[ i ]) {~~ 72b' | |
| nal_initial_cpb_removal_delay[ i ] | u(v) |
| nal_initial_cpb_removal_offset[ i ] | u(v) |
| } | |
| ~~{else}~~ | |
| for( i=0; i < CpbCnt; i++ ) { 76 | |
| nal_initial_cpb_removal_delay[ i ] | u(v) |
| nal_initial_cpb_removal_offset[ i ] | u(v) |
| if( sub_pic_hrd_params_present_flag \|\| | |
| irap_cpb_params_present_flag ) { | |
| nal_initial_cpb_removal_delay[ i ] | u(v) |
| nal_initial_cpb_removal_offset[ i ] | u(v) |
| } | |
| } | |
| } | |

| | |
|---|---|
| InitRem | 6.57 |
| bitrate | 8.45 |
| framerate dist | 4 |

| | PicSize | RmD | Afinal | ArrivalEar | ArrivalInit | CPBSize |
|---|---|---|---|---|---|---|
| | 9 | 6.57 | 4.26035503 | 0 | 0 | 12 |
| 1 | 3 | 10.57 | 5.68047337 | 4 | 4.26035503 | 7 |
| 2 | 4 | 14.57 | 9.89349112 | 8 | 8 | 9.429125 |
| 3 | 6 | 18.57 | 14.8402367 | 12 | 12 | 8 |
| 4 | 2 | 22.57 | 16.9467456 | 16 | 16 | 4 |
| 5 | 2 | 26.57 | 20.9467456 | 20 | 20 | 7.429125 |
| 6 | 9 | 30.57 | 28.260355 | 24 | 24 | 13.879125 |
| 7 | 12 | 34.57 | 33.9408284 | 28 | 28.260355 | 13.329125 |
| 8 | 6 | 38.57 | 36.7810651 | 32 | 33.9408284 | 9.779125 |
| 9 | 6 | 42.57 | 39.6213018 | 36 | 36.7810651 | 11 |
| 10 | 5 | 46.57 | 42.3668639 | 40 | 40 | 10.429125 |
| 11 | 7 | 50.57 | 47.3136095 | 44 | 44 | 9 |
| 12 | 2 | 54.57 | 48.9467456 | 48 | 48 | 7 |
| 13 | 5 | 58.57 | 54.3668639 | 52 | 52 | 6 |
| 14 | 1 | 62.57 | 56.4733728 | 56 | 56 | 6.429125 |
| 15 | 8 | 66.57 | 63.7869822 | 60 | 60 | 13.429125 |
| 16 | 9 | 70.57 | 68.260355 | 64 | 64 | 12 |
| 17 | 3 | 74.57 | 69.6804734 | 68 | 68.260355 | 8.429125 |
| 18 | 6 | 78.57 | 74.8402367 | 72 | 72 | 11.429125 |
| 19 | 8 | 82.57 | 79.7869822 | 76 | 76 | 13 |
| 20 | 5 | 86.57 | 82.3668639 | 80 | 80 | 10.429125 |
| 21 | 8 | 90.57 | 87.7869822 | 84 | 84 | 13.429125 |
| 22 | 7 | 94.57 | 91.3136095 | 88 | 88 | 12.429125 |
| 23 | 6 | 98.57 | 94.8402367 | 92 | 92 | 13.879125 |

Fig. 35

| | |
|---|---|
| InitRem | 5.1 |
| bitrate | 9.5 |
| framerate dist | 4 |

| | PicSize | RmD | Afinal | ArrivalEar | ArrivalInit | CPBSize |
|---|---|---|---|---|---|---|
| | 9 | 5.1 | 3.78947368 | 0 | 0 | 11.6125 |
| 1 | 3 | 9.1 | 5.26315789 | 4 | 4 | 5.6125 |
| 2 | 4 | 13.1 | 9.68421053 | 8 | 8 | 6.6125 |
| 3 | 6 | 17.1 | 14.5263158 | 12 | 12 | 8 |
| 4 | 2 | 21.1 | 16.8421053 | 16 | 16 | 4 |
| 5 | 2 | 25.1 | 20,8421053 | 20 | 20 | 4.6125 |
| 6 | 9 | 29.1 | 27.7894737 | 24 | 24 | 11.6125 |
| 7 | 12 | 33.1 | 33.0526316 | 28 | 28 | 12.1125 |
| 8 | 6 | 37.1 | 35.5789474 | 32 | 33.0526316 | 8.6125 |
| 9 | 6 | 41.1 | 38.5263158 | 36 | 36 | 8.6125 |
| 10 | 5 | 45.1 | 42.1052632 | 40 | 40 | 7.6125 |
| 11 | 7 | 49.1 | 47.9473684 | 44 | 44 | 9 |
| 12 | 2 | 53.1 | 48.8421053 | 48 | 48 | 4.6125 |
| 13 | 5 | 57.1 | 54.1052632 | 52 | 52 | 6 |
| 14 | 1 | 61.1 | 56.4210526 | 56 | 56 | 3.6125 |
| 15 | 8 | 65.1 | 63.3684211 | 60 | 60 | 10.6125 |
| 16 | 9 | 69.1 | 67.7894737 | 64 | 64 | 11.6125 |
| 17 | 3 | 73.1 | 69.2631579 | 68 | 68 | 5.6125 |
| 18 | 6 | 77.1 | 74.5263158 | 72 | 72 | 8.6125 |
| 19 | 8 | 81.1 | 79.3684211 | 76 | 76 | 10.6125 |
| 20 | 5 | 85.1 | 82.1052632 | 80 | 80 | 7.6125 |
| 21 | 8 | 89.1 | 87.3684211 | 84 | 84 | 10.6125 |
| 22 | 7 | 93.1 | 90.9473684 | 88 | 88 | 9.6125 |
| 23 | 6 | 97.1 | 94.5263158 | 92 | 92 | 12.1125 |

Fig. 36

| | |
|---|---|
| InitRem | 10 |
| bitrate | 6 |
| framerate dist | 4 |

| | PicSize | RmD | Afinal | ArrivalEar | ArrivalInit | CPBSize |
|---|---|---|---|---|---|---|
| | 9 | 10 | 6 | 0 | 0 | 15 |
| 1 | 3 | 14 | 8 | 4 | 6 | 10 |
| 2 | 4 | 18 | 10.6666667 | 8 | 8 | 12 |
| 3 | 6 | 22 | 16 | 12 | 12 | 10 |
| 4 | 2 | 26 | 17.3333333 | 16 | 16 | 7 |
| 5 | 2 | 30 | 21.3333333 | 20 | 20 | 11 |
| 6 | 9 | 34 | 30 | 24 | 24 | 15 |
| 7 | 12 | 38 | 38 | 28 | 30 | 12 |
| 8 | 6 | 42 | 42 | 32 | 38 | 6 |
| 9 | 6 | 46 | 46 | 36 | 42 | 6 |
| 10 | 5 | 50 | 49.3333333 | 40 | 46 | 6 |
| 11 | 7 | 54 | 54 | 44 | 49.3333333 | 7 |
| 12 | 2 | 58 | 55.3333333 | 48 | 54 | 6 |
| 13 | 5 | 62 | 58.6666667 | 52 | 55.3333333 | 9 |
| 14 | 1 | 66 | 59.3333333 | 56 | 58.6666667 | 10 |
| 15 | 8 | 70 | 65.3333333 | 60 | 60 | 15 |
| 16 | 9 | 74 | 71.3333333 | 64 | 65.3333333 | 13 |
| 17 | 3 | 78 | 73.3333333 | 68 | 71.3333333 | 10 |
| 18 | 6 | 82 | 77.3333333 | 72 | 73.3333333 | 13 |
| 19 | 8 | 86 | 82.6666667 | 76 | 77.3333333 | 13 |
| 20 | 5 | 90 | 86 | 80 | 82.6666667 | 11 |
| 21 | 8 | 84 | 91.3333333 | 84 | 86 | 12 |
| 22 | 7 | 98 | 96 | 88 | 91.3333333 | 10 |
| 23 | 6 | 102 | 100 | 92 | 96 | 9 |

Fig. 37

HYPOTHETICAL REFERENCE DECODER

CROSS-REFERENCES TO RELATED APPLICATIONS

This application is a continuation of U.S. application Ser. No. 17/461,795, filed Aug. 30, 2021, which is a continuation of International Application No. PCT/EP2020/055122, filed Feb. 27, 2020, which claims priority to European Application No. 19160423.09, filed Mar. 1, 2019, the entire contents of each of which are incorporated herein by reference in this application.

The hypothetical reference decoder, HRD, and its use to check bitstream and decoder conformance is typically specified in video coding standards, such as in AVC (Advanced Video Codec) and HEVC (High Efficiency Video Coding).

Embodiments according to the present invention are related to video streams, video encoders, video decoders, network nodes, apparatuses for managing the coded picture buffer, CPB, of a video decoder, and apparatuses for splicing together video data streams.

BACKGROUND OF THE INVENTION

In the following, an introduction to the background of the invention will be provided.

In order to do so, a HRD buffer model is specified consisting of a Hypothetical stream scheduler (HSS), a Coded Picture Buffer (CPB), a decoding process (which is considered instantaneous), a Decoded Picture Buffer (DPB) and an output cropping process as shown in the FIG. 2.

The model defines the timing and bitrate with which the bitstream is fed into the coded picture buffer, the time at which its decoding unit (either AU, Access Unit, or VCL NAL (VCL: Video Coding Layer, NAL: Network abstraction layer) unit in case of low delay operation mode) is removed from the CPB and decoded instantaneously, as well the output time at which the pictures are output from the DPB.

By doing so, it is also possible to define the CPB sizes that may be used for a decoder to avoid buffer overflows (more data is sent to the decoder than what it can be kept into the CPB) or underruns less data is send to the decoder (at a lower bitrate that may be useful) and useful decoding units are not at the right time at the decoder for decoding.

State-of-the-art coding standards specify different parameters to describe a bitstream and HRD requirements and buffer models.

For instance, hrd_parameters defined in HEVC per sublayer consist of one or more pairs of Bitrate(i) and CPBsize (i), which indicate that if the stream scheduler feeds the CPB of size CPBsize(i) with a bitrate of Bitrate(i), no overflow or underflow will happen.

In conjunction with the hrd_parameter syntax element, there is additional timing information present in the bitstream that specifies the removal time of a picture from the CPB that indicates when the VCL NAL units belonging to that picture are sent to decoding.

For ease of understanding sub-picture processing is omitted of the description.

The relevant information is present in the Buffering Period SEI (Supplemental enhancement information) message with the InitialCPBRemovalDelay(i), InitialCPBRemovalOffset(i) and AuCPBRemovalDelay and in the Picture Timing SEI message with AuCPBRemovalDelay.

For the most basic operation only InitialCPBRemovalDelay(i) and AuCPBRemovalDelay are used.

In that case, the first access unit that is decoded is a Random Access Point, RAP, with its corresponding Buffering Period SEI message and time 0 is defined as the time at which the first bit of the Random Access Point enters the CPB. Then at time InitialCPBRemovalDelay(i) the picture corresponding to the Random Access Point is removed from the CPB and further non-RAP pictures the removal of the CPB happens at InitialCPBRevovalDelay(i)+AuCPBRemovalDelay (HEVC defines some parameters to convert the delay to time, i.e. ClockTick, but this is here ignored for simplification).

When the next RAP comes the removal time is computed as before for non-RAP pictures, i.e., InitialCPBRevovalDelay(i)+AuCPBRemovalDelay and this new value is used as anchor for further deltas up to another RAP, i.e.

$$anchorTime = InitialCPBRemovalDelay(i) + AuCPBRemovalDelay$$

and then removal of pictures becomes anchorTime+AuCPBRemovalDelay and the anchorTime is updated at the next RAP with a Buffering SEI message, $$anchorTime = anchorTime + AuCPBRemovalDelay \text{ and so forth.}$$

The described operation mode is the simplest one. There are further cases that need to be taken into account.

In the present situation, there are several drawbacks which this invention overcomes. Details are laid out below.

SUMMARY

According to an embodiment, a video data stream may have a video encoded thereinto and may have: first timing information on first coded picture buffer, CPB, removal times to be applied at decoder side in case of buffering a complete version of the video data stream, second timing information on second CPB removal times to be applied at decoder side for buffering a reduced version of the video data stream, differing from the video data stream by removal of a portion of the video data stream from the complete version of the video data stream.

Another embodiment may have a video encoder configured to: encode a video into a video data stream; provide the video data stream with first timing information on first CPB removal times to be applied at decoder side in case of buffering a complete version of the video data stream, second timing information on second CPB removal times to be applied at decoder side for buffering a reduced version of the video data stream, differing from the video data stream by removal of a portion of the video data stream from the complete version of the video data stream.

Another embodiment may have a network node for forwarding an inventive video data stream, configured to remove the portion of the video data stream from the video data stream.

Another embodiment may have an apparatus for managing the CPB of a video decoder which decodes an inventive video data stream in a manner buffered by the CPB, the apparatus configured to manage the CPB according to the first timing information in case of the portion being included in the video data stream, the second timing information in case of the portion having been removed.

According to another embodiment, a method of encoding a video into a video data stream, may have the step of: providing the video data stream with first timing information on first coded picture buffer, CPB, removal times to be applied at decoder side in case of buffering a complete version of the video data stream, second timing information on second CPB removal times to be applied at decoder side for buffering a reduced version of the video data stream, differing from the video data stream by removal of a portion of the video data stream from the complete version of the video data stream.

According to another embodiment, a method of encoding a video into a video data stream, may have the step of providing the video data stream with first timing information on first CPB removal times to be applied at decoder side in case of buffering a complete version of the video data stream, second timing information on second CPB removal times to be applied at decoder side for buffering a reduced version of the video data stream, differing from the video data stream by removal of a portion of the video data stream from the complete version of the video data stream.

Another embodiment may have a method of forwarding an inventive video data stream, the method having the step of removing the portion of the video data stream from the video data stream.

Another embodiment may have a method of managing the CPB of a video decoder which decodes an inventive video data stream in a manner buffered by the CPB, the method having the step of managing the CPB according to the first timing information in case of the portion being included in the video data stream, the second timing information in case of the portion having been removed.

An embodiment according to the present invention refers to a video data stream having a video encoded thereinto and comprising first timing information on first coded picture buffer, CPB, removal times to be applied at decoder side in case of buffering a complete version of the video data stream, and second timing information on second CPB removal times to be applied at decoder side for buffering a reduced version of the video data stream, differing from the video data stream by removal of a portion of the video data stream from the complete version of the video data stream.

Another embodiment according to the present invention refers to a video data stream having a video encoded thereinto, comprising first HRD timing information data relating to a minimum CPB feed bitrate, second HRD timing information data relating to a maximum CPB feed bitrate, wherein the first HRD timing information data and second HRD timing information data allow for a determination of third HRD timing information for an actual CPB feed bitrate by linearly interpolating between the first and second HRD timing information data.

Another embodiment according to the present invention refers to a video data stream comprising a sequence of picture portions, each picture portion having a picture of a video encoded thereinto, the picture portions comprising first type picture portions serving as CPB removal time references and second type picture portions, first timing information in each picture portion on a first CPB removal time of the respective picture portion, the first CPB removal time measuring a lapsed time since a removal a preceding first type picture portion, and second timing information in each of predetermined first type picture portions on a second CPB removal time of the respective predetermined first type picture portion in case of resuming decoding the video data stream from the respective predetermined first type picture portion onwards, the second CPB removal time measuring a lapsed time since a CPB arrival of a first bit of the respective predetermined first type picture portion, a splice point indication which indicates picture portions for which a temporal difference between a final CPB arrival thereof and a CPB removal thereof exceeds a predetermined threshold, so that same may serve as a last picture portion before a splice point with another video data stream.

Another embodiment according to the present invention refers to a video encoder to encode a video into a video data stream, and to provide the video data stream with first timing information on first CPB removal times to be applied at decoder side in case of buffering a complete version of the video data stream, and second timing information on second CPB removal times to be applied at decoder side for buffering a reduced version of the video data stream, differing from the video data stream by removal of a portion of the video data stream from the complete version of the video data stream.

Another embodiment according to the present invention refers to a video encoder to encode a video into a video data stream, and to provide the video data stream with first HRD timing information relating to a minimum CPB feed bitrate, second HRD timing information relating to a maximum CPB feed bitrate, wherein the first HRD timing information and second HRD timing information allow for a determination of third HRD timing information for an actual CPB feed bitrate by linearly interpolating between the first and second HRD timing information.

Another embodiment according to the present invention refers to a video encoder for encoding a video into a video data stream so that the video data stream comprises a sequence of picture portions, each picture portion having a picture of a video encoded thereinto, wherein the video encoder classifies the picture portions into first type picture portions serving as CPB removal time references and second type picture portions, provide the video data stream with first timing information in each picture portion on a first CPB removal time of the respective picture portion, the first CPB removal time measuring a lapsed time since a removal a preceding first type picture portion, and second timing information in each of predetermined first type picture portions on a second CPB removal time of the respective predetermined first type picture portion in case of resuming decoding the video data stream from the respective predetermined first type picture portion onwards, the second CPB removal time measuring a lapsed time since a CPB arrival of a first bit of the respective predetermined first type picture portion, check for each of predetermined picture portions whether a temporal difference between a final CPB arrival thereof and a CPB removal thereof exceeds a predetermined threshold, so that same may serve as a last picture portion before a splice point with another video data stream and provide the video data stream with splice point indication to indicate those predetermined picture portions for which the temporal difference between a final CPB arrival thereof and a CPB removal thereof exceeds the predetermined threshold.

Another embodiment according to the present invention refers to a network node for forwarding a video data stream to remove the portion of the video data stream from the video data stream.

Another embodiment according to the present invention refers to an apparatus for managing the CPB of a video decoder which decodes a video data stream in a manner buffered by the CPB, the apparatus manages the CPB according to the first timing information in case of the portion being comprised by the video data stream, and the second timing information in case of the portion having been removed.

Another embodiment according to the present invention refers to an apparatus for managing the CPB of a video decoder which decodes a video data stream having a video encoded thereinto, the apparatus derives from the video data stream first HRD timing information relating to a minimum CPB feed bitrate, derive second HRD timing information relating to a maximum CPB feed bitrate, determine third HRD timing information for an actual CPB feed bitrate by linearly interpolating between the first and second HRD timing information, and manage the CPB using the third HRD timing information.

Another embodiment according to the present invention refers to an apparatus for managing the CPB of a video decoder which decodes a video data stream in a manner buffered by the CPB, the apparatus checks whether the concatenation flag in the first predetermined first type picture portion indicates that a spliced-in took place at the first predetermined first type picture portion, determine a time to remove the first predetermined first type picture portion from the CPB. Wherein the determination is based on the first timing information of the first predetermined first type picture portion if the concatenation flag in the first predetermined first type picture portion indicates that no splice-in took place at the first predetermined first type picture portion, and based on the second and third timing information of the first predetermined first type picture portion if the concatenation flag in the first predetermined first type picture portion indicates that a splice-in took place at the first predetermined first type picture portion.

Another embodiment according to the present invention refers to an apparatus for splicing together a first video data stream and a second video data stream among which each comprises a sequence of picture portions, each picture portion having a picture of a video encoded thereinto, the picture portions comprising first type picture portions serving as CPB removal time references and second type picture portions, first timing information in each picture portion on a first CPB removal time of the respective picture portion, the first CPB removal time measuring a lapsed time since a removal a preceding first type picture portion, and second timing information in each of predetermined first type picture portions on a second CPB removal time of the respective predetermined first type picture portion in case of resuming video data stream decoding from the respective predetermined first type picture portion onwards, the second CPB removal time measuring a lapsed time since a CPB arrival of a first bit of the respective predetermined first type picture portion, wherein the second video data stream comprises a concatenation flag and third timing information in a first predetermined first type picture portion, the concatenation flag being set to a second state indicative of the second video data stream the first predetermined first type picture portion continues the second video data stream, and the third timing information indicates a third CPB removal time of the first predetermined first type picture portion which serves for determining a CPB removal time when splicing-in the second video data stream at the first predetermined first type picture portion, the third CPB removal time measuring a lapsed time since a most recent CPB removal of a non-discardable picture portion. The inventive apparatus checks whether a splice point indication in the first video data stream indicates for a predetermined picture portion that a temporal difference between a CPB arrival thereof and a CPB removal thereof exceeds a predetermined threshold, so that same may serve as a last picture portion before the first video data stream is to be spliced with the second video data stream, if yes, set the concatenation flag in the first predetermined first type picture portion of the second video data stream to a first state indicating that the second video data stream has been spliced-in at the first predetermined first type picture portion, and concatenate the first and second data stream at the predetermined picture portion and the first predetermined first type picture portion, respectively, so as to obtain a spliced video data stream.

The above described concepts can be implemented by methods according to embodiments of the present invention. These methods are based on the same considerations as the above-described decoders, encoders, apparatuses, and data streams. However, it should be noted that the methods can be supplemented by any of the features, functionalities and details described herein, also with respect to the decoders, encoders, apparatuses, and data streams. Moreover, the methods can be supplemented by the features, functionalities, and details of the decoders, encoders, apparatuses, and data streams, both individually and taken in combination.

Finally, also the concepts can be used to produce an encoded data stream according to embodiments of the present invention. The data stream can also be supplemented by the features, functionalities, and details of the decoders, encoders, apparatuses, and methods, both individually and taken in combination.

BRIEF DESCRIPTION OF THE DRAWINGS

Embodiments of the present invention will be detailed subsequently referring to the appended drawings, in which:

FIGS. 8, 10, 11, 20 to 24A and 24B, and 26 to 34 show exemplary signaling syntaxes according to embodiments of the present application, FIGS. 15, 17, and 19 show exemplary removal time values when different frame rates are offered with the same bitstream according to embodiments of the present application, FIGS. 35, 36, and 37 show tables of values of computation of CPB sizes according to embodiments of the present application.

In the figures, similar reference signs denote similar elements and features.

DETAILED DESCRIPTION OF THE INVENTION

In the following, some considerations underlying the present invention will be discussed and several solutions will be described. In particular, a number of details will be disclosed, which can optionally be introduced into any of the embodiments disclosed herein. In particular, the following description starts with a brief presentation of issues occurring in, and faced when dealing with, splicing, stream extraction, stripping scalable bitstreams and bitstream feeding at various transmission conditions. Then, certain fixes of issues are presented with subsequently presenting embodiments making use of the corresponding fixes.

The following issues are inspected and addressed.

Splicing: The removal time of the previous RAP with a Buffering SEI is used as an anchor to add an AuCPBRemovalDelay so that the removal time of the CPB of a picture is used.

However, when splicing occurs, it is not possible to know at the splicing point, what was the previous values of the anchorTime easily. Therefore, in such a case the derivation of the CPB removal time of the RAP with a buffering SEI that is spliced is carried out differently.

In order to solve that issue, HEVC includes two additional parameters, which are the concatenation_flag, which indicates whether splicing has happened at the RAP containing the Buffering Period SEI message and AuCPBRemovalDelta time that instead of referring to the previous RAP with Buffering Period SEI message refers to a delta in time to the previous non-discardable picture. Thus, it prevents from having to compute any value and rewrite a Buffering Period SEI message at splicing points. The CPB removal time from the RAP where splicing occurs would be then $$\text{Removal}(previousNonDiscardable) + AuCPBRemovalDelta.$$

Figure 3:
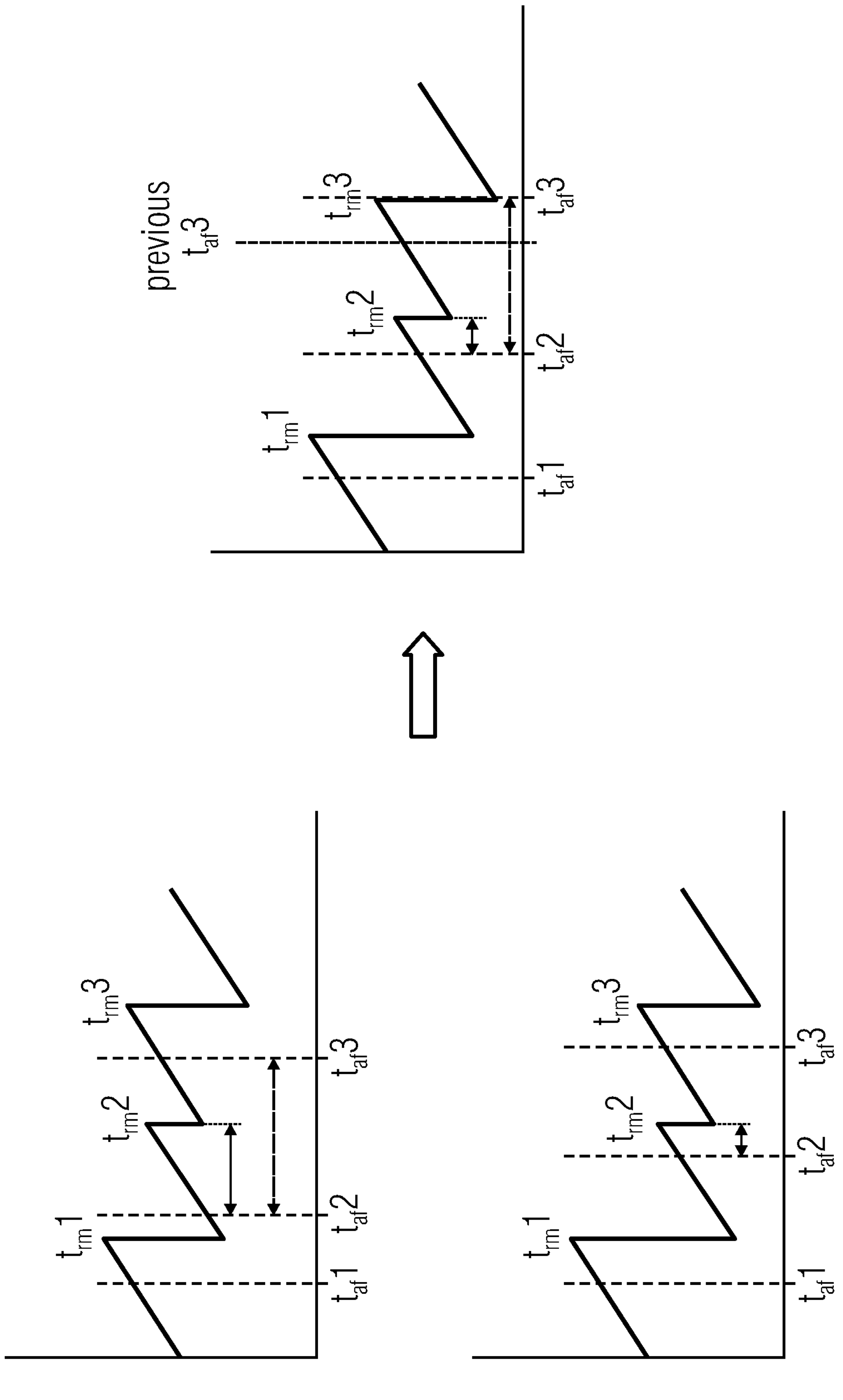
FIGS. 3 to 7 and 9 show the status of a coded picture buffer including removal times according to one embodiment of the present application.

This assumes a seamless splicing scenario. However, it is not possible to ensure that the CPB status is the same at the splicing point at the original bitstream (when the RAP with buffering period SEI message result of splicing was not spliced but within its original bitstream) and when splicing. More concretely, FIG. 3 shows the described issue, where the bitstream at the top at frame #3 is spliced with the bitstream at the bottom from frame #2 onwards.

Therefore, instead of having a removal time of $$\text{Removal}(previousNonDiscardable) + AuCPBRemovalDelta$$

as discussed above (which would be earlier that when the frame has arrived $t_{af}3$) a removal time of $$\text{Removal}(previousNonDiscardable) + InitialCPBRemovalDelay(i) + t_{af}2 - t_{rm}2$$

is used instead.

That is the removal time of the spliced RAP is:

$$\text{Removal}(previousNonDiscardable) + SplicingDelta$$

where SplicingDelta is set to the maximum value of AuCPBRemovalDeta and InitialCPBRevovalDelay(i)+$t_{af}2-t_{rm}2$ In the case that the second value happens to be bigger than the first, e.g. as shown in FIG. 3 a non-seamless splicing would happen.

This splicing operation only works if the first bitstream is ended at the corresponding NonDiscardable picture, since the AuFinalArrivalTime and removal time of another picture following the NonDiscardable picture is unknown and therefore, the derived removal time could be wrong (InitialCPBRemovalDelay(i)+$t_{af}X-t_{rm}X$) if the difference among both values $t_{af}X$ and $t_{rm}X$ were not the same as for the NonDiscardable picture.

CPB Fullness and Delay: Another issue that happens with the HRD model is that in order to make use of the CPB buffer, time delay for the removal of the first Access Unit may be used.

When the first RAP after splicing comes into the CPB the removal of that AU is delayed to InitialCPBRemovalDelay (i) time later as already discussed. By feeding the CPB at a Bitrate(i) during InitialCPBRemovalDelay(i) a given CPB fullness is achieved, e.g. $CPB_A$. It is afterwards not possible at further RAPs with a buffering period SEI message to achieve a $CPB_B$ that is bigger than $CPB_A$. The reason can be seen mathematically checking the earliest time at which an AU can enter the CPB.

$$initArrivalTime[n] = \text{Max}(AuFinalArrivalTime[n-1], initArrivalEarliestTime[n]), \text{ with}$$

$$initArrivalEarliestTime[n] = RemovalTime[n] - InitCpbRemovalDelay(i)$$

Which means that if an AU following with buffering period SEI message cannot enter the CPB earlier than InitialCPBRemovalDelay(i) of its removal time, it is not possible to achieve a $CPB_B$ that is bigger than $CPB_A$, since feeding the CPB with Bitrate(i) during InitialCPBRemovalDelay(i) only achieves a CPB fullness of $CPB_A$.

Figure 4:
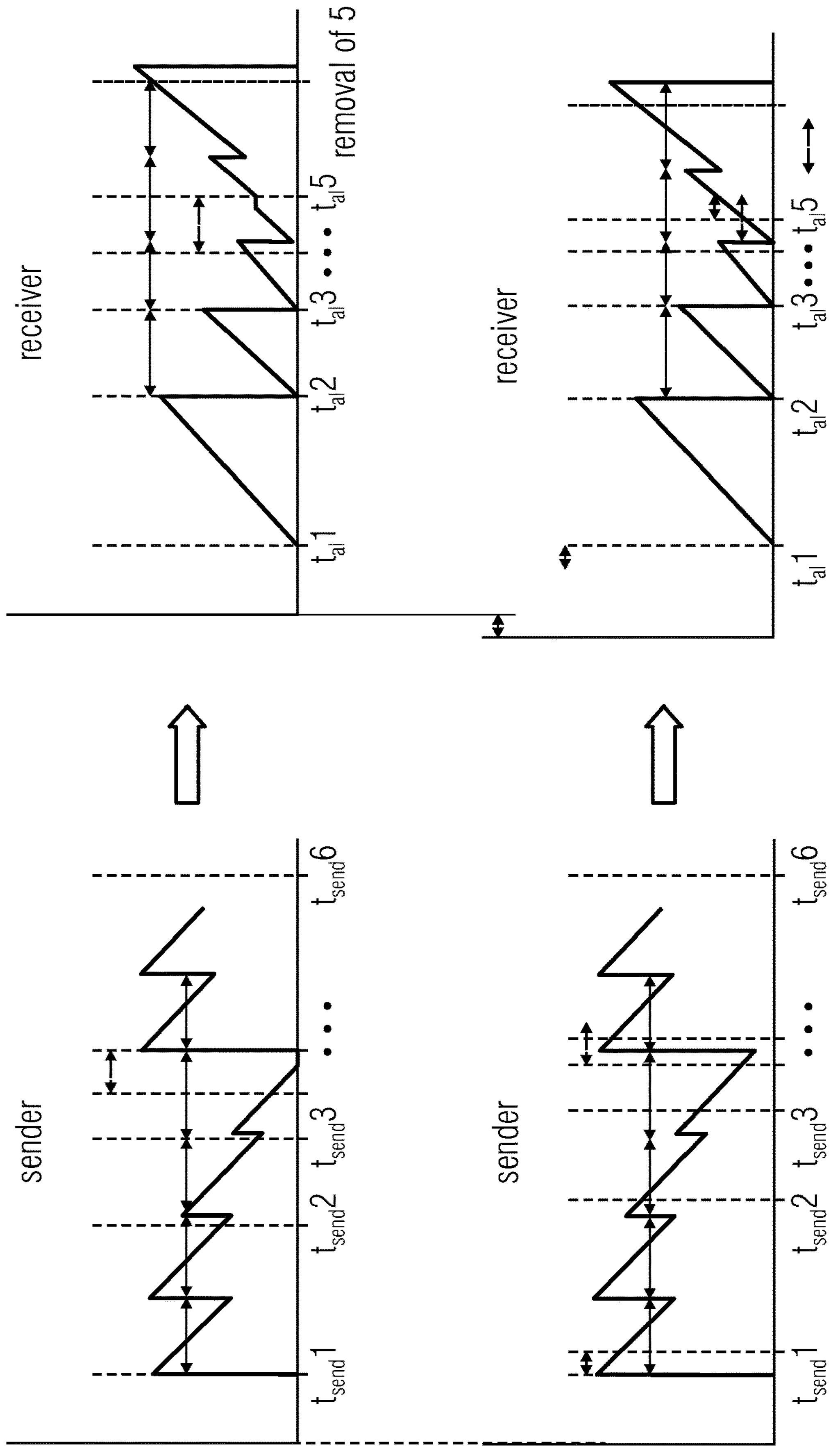

To solve this issue, the idea is that a hypothetical sender (or the HSS in the figure) delays the scheduling of the first RAP with a buffering SEI message with a given time offset InitialCPBRemovalOffset(i) as shown in FIG. 4.

It is important to mention that this only works for VBR and not to CBR as in CBR $$initArrivalTime[n] = AuFinalArrivalTime[n-1].$$

With that, scheduling changes to the following $$initArrivalEarliestTime[n] = RemovalTime[n] - InitCpbRemovalDelay(i) - InitialCpbRemovalOffset(i)$$

which means that the CPB size of $CPB_B$ could correspond to a size that is achieved by feeding the CPB with Bitrate(i) for InitCpbRemovalDelay(i)+InitialCPBRemovalOffset(i)

Dropping of AUs: The HRD model in HEVC also supports dropping of some NAL units. More concretely, “discardable” pictures associated to RAP picture can be dropped. By “discardable” pictures RASL (Random Access Skipped Leading) pictures are meant, i.e. picture that in open GOP (group of pictures) structures precede the RAP picture in presentation order but follow in decoding order and that reference also pictures preceding the RAP in decoding order. Therefore, when random accessing at the corresponding RAP picture RASL pictures cannot be decoded. Hence, when splicing such a bitstream with another bitstream or when initiating a session at that RAP position, sending RASL pictures is a waste of resources and in some cases are these pictures are dropped before transmission.

Obviously, the timing information, i.e. initial arrival time and removal time of picture changes when the bitstream is modified.

Therefore, the Buffering Period SEI message contains alternative timings for the case that the RASL picture associated with the RAP with a buffering period SEI message are dropped:

AltInitCpbRemovalDelay(i)

AltInitialCPBRemovalOffset(i)

Temporal Scalability: When dropping sub-layers the timing information changes as well. For instance, if the original bitstream has 60 Hz, one would expect that the distance in the nominal removal time between two consecutive pictures in decoding order would be 1/60 seconds. And when dropping every second picture the distance would be 1/30 seconds. This means that the Picture Timing SEI messages would need to be substituted. Besides, the InitCpbRemovalDelay(i) and InitialCPBRemovalOffset(i) would need to be changed as well. So the Buffering Period SEI messages would need to be substituted. For such an operation, typically additional Picture Timing SEI messages and Buffering Period SEI messages are contained in the so called nesting SEI messages. When a middleware carries out a sub-layer bitstream extraction (e.g. dropping every second frame to get a 30 Hz bitstream from a 60 Hz bitstream) the original Picture Timing SEI messages and Buffering Period SEI messages are substituted with the corresponding Picture Timing SEI messages and Buffering Period SEI messages from the nesting SEI message.

Bitrate Variants: HRD parameters such as initial_removal_delay and initial_removal_delay_offset, as well as Bitrate and CPB_size, are typically provided for several values. The idea is that the bitrate with which a given bitstream is fed into the CPB can vary and therefore, several values are provided that lead to a valid HRD model.

However, there are some aspects that have not been taken into account properly:

There can be only a Bitrate that leads to CBR

If the proper Bitrate is not known a priori, the bitstream cannot provide a valid HRD model (parameters for it).

As outlined above, splicing at nonDiscardable points is a task difficult to achieve so far, and accordingly, the embodiments described in the following aim at achieving exactly a possibility that splicing is enabled even at a nonDiscardable point. The first simple fix would be to correct the formula to not always use the non-discardable picture as anchor but the last picture received after the splicing point. I.e., change from:

$$\text{Removal}(\textit{previousNonDiscardable}) + \textit{SplicingDelta}$$

where SplicingDelta is set to the maximum value of AuCPBRemovalDelta and InitialCPBRevovalDelay(i)+$t_{af}2-t_{rm}2$ to the maximum value among:

$$\text{Removal}(\textit{previousNonDiscardable}) + \textit{AuCPBRemovalDelta}$$

$$\text{Removal}(\textit{lastPictureBeforeSplicing}) + \textit{InitialCPBRemovalDelay}(i) + t_{af}2 - t_{rm}2,$$

where

Removal(lastPictureBeforeSplicing) is actually $t_{rm}2$. (In the example above)

Still, as can be seen in the formula if the splicer would decide to consider a previous picture as the last picture before splicing, e.g. $t_{rm}1$, the maximum value among both cases would be always Removal(previousNonDiscardable)+AuCPBRemovalDelta. That would prevent seamless splicing at any AU unless the splicer changes the value of AuCPBRemovalDelta accordingly and is sure that the difference of ($t_{af}2-t_{rm}2$) is such that seamless switching is feasible.

Changing the value of AuCPBRemovalDelta in a Buffering period SEI would be feasible. However, it is not simple for a splicer to keep track of the values of ($t_{af}X$ and $t_{rm}X$) as keeping track of ($t_{af}X$ and $t_{rm}X$) is not so simple.

Since seamless splicing at different points is desirable, some signalling to indicate the splicer whether a given picture allows for it would be desirable. This could be achieved by checking at the encoder side the ($t_{af}X$ and $t_{rm}X$) values, and making sure that the difference ($t_{rm}X-t_{af}X$) does not become smaller than a given value. The signalling could come for instance in a picture timing SEI associated with the pictures that can be use as the last before a splicing point. An example can be seen in FIG. 26.

Or even at the nonDiscardable picture as a promise that following discardable pictures fulfil the requirement. An example can be seen in FIG. 27.

Since the requirement on the minimum value that ($t_{rm}X-t_{af}X$) has to fulfil is related to the initial_removal_delay of the spliced bitstream. There should be some indication at the buffering period SEI about for what value the pictures can be used for seamless splicing. An example can be seen in FIG. 28.

Thus, as an outcome of the thoughts for possible fixes just having been outlined, the following embodiments were assessed.

Figure 25:
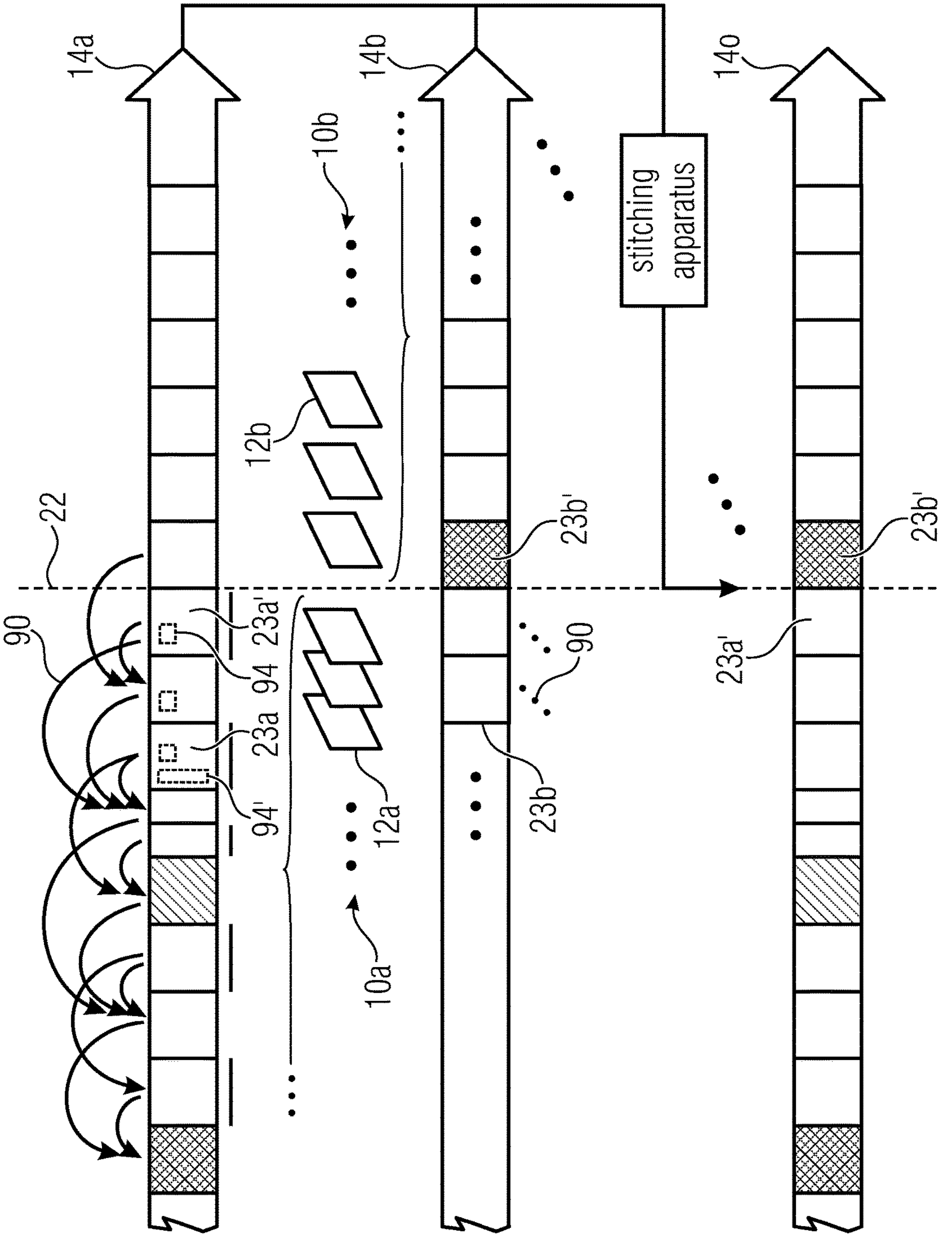
FIG. 25 shows encoded data streams being stitched together according to one embodiment of the present application.

In FIG. 25, and the signalling examples of FIGS. 26, 27, and 28, it can be seen that the video data stream can comprise a sequence of picture portions 23*a*, such as access units, each picture portion having a picture 10*a* of a video 12*a* encoded thereinto. FIG. 25 depicts two data streams 14*a* and 14*b* and illustrates a splicing of streams 14*a* and 14*b* at splicing point 92 so that a trailing end of a portion of stream 14*a* preceding, i.e. to the left of, splicing point 92, abuts a leading end of a portion of stream 14*b* following, i.e. to the right of, splicing point 92. The result of the splicing which is performed by a splicing apparatus such as a server, a video conferencing system or a client-server streaming system, is shown at 14*c*, i.e. the spliced data stream.

The picture portions can comprise first type picture portions, which are shown cross-hatched or simply hatched in some figures, and which are called marked pictures above. Examples therefor are AUs with, or comprising, a buffering period SEI. These first type picture portions serve as CPB removal time references, that is, their CPB removals are used as reference, anchorTime, for other timings which are given as time offsets such as AuCPBRemovalDelay.

The picture portions further can comprise second type picture portions, which are shown non-hatched in some figures such as picture not comprising any buffering period SEI.

The data streams 14*a* and 14*b* additionally comprise first timing information 95, compare AuCPBRemovalDelay or au_cpb_removal_delay_minus1, in each picture portion, which informs on a first CPB removal time of the respective picture portion. The first CPB removal time measures a lapsed time since a removal a preceding first type picture portion, namely preceding in coding or bitstream order which is depicted in FIG. 25, and in particular, the nearest preceding one.

The data streams 14*a* and 14*b* further comprise second timing information, compare initial_removal_delay which might be present in the picture timing syntax of the buffering period SEI such as for example before the splice point indication discussed below, in each of predetermined first type picture portions. These predetermined first type picture portions are indicated cross-hatched in FIG. 25 in order to distinguish same from the other first type picture portions which are shown simply-hatched and are specific first type picture portions such as for example AUs with a buffering period SEI indicated to be a RAP or, in other words, AUs which comprise a buffering period SEI and are indicated to be a RAP. The second timing information informs on a second CPB removal time of the respective predetermined first type picture portion in case of resuming decoding the video data stream from the respective predetermined first type picture portion onwards. The second CPB removal time measures a lapsed time since a CPB arrival, i.e. an arrival at the decoder's CPB, of a first bit of the respective predetermined first type picture portion.

At least one of the data streams, in FIG. 25 it's 14*a*, namely the on ought to be split, or spliced apart, in order to get another stream, here 14*b*, appended to its splicing point 92, further can comprise a splice point indication 94, 94', for example spliceable_flag or following_pic_spliceable_flag, which indicates picture portions, for example no RAPs, for which a temporal difference such as $t_{rm}\#\text{-}t_{af}\#$ indicated above, between a final CPB arrival thereof and a CPB removal thereof exceeds a predetermined threshold, so that same may serve as a last picture portion before a splice point 92 with another video data stream 14*b*, i.e. are suitable for allowing splicing.

It should be noted that the threshold can for example be computed as follows:

It is assumed, that removal times are equidistant und equal to 1/framerate. The desired removal time for the newly spliced AU such as AU 23*b'* in FIG. 25 should then be $t_{rm}\#$+1/framerate where $t_{rm}\#$ is the removal time of the immediately preceding AU or picture portion, where 23'*a* points to.

$t_{rm}\#$+1/framerate should be equal to or larger than $t_{af}\#$+ initial_removal_delay where $t_{af}\#$ is the CPB final arrival time of the respective AU 23*b'*. Thus follows that the "predetermined threshold" is initial_removal_delay−1/framerate.

And with the variant of the max_val_initial_removal_delay_for_seamless_splicing, i.e. the variant where this threshold is explicitly indicated in at last one of the data streams, such as the data stream 14*a* to which the other stream 14*b* is to be appended, $t_{rm}\#$+1/framerate is equal or larger than $t_{af}\#$+max_val_initial_removal_delay_for_ _seamless_splicing. It follows, that, then, "predetermined threshold" is max_val_initial_removal_delay_for_seamless_splicing−1/framerate.

That is, the video data stream 14*a* can also comprise an indication 99 of a maximum second CPB removal time value which indicates that as long as the second CPB removal time of a starting first-type picture portion 23*b'* of the other video data stream 14*b* at which the other video data stream 14*b* is concatenated with the video data stream 14*a* at the splice point 92 is below the maximum second CPB removal time value, concatenating the other video data stream 14*b* to any of the picture portions for which the temporal difference $t_{rm}\#\text{-}t_{af}\#$ between the final CPB arrival thereof and the CPB removal thereof is indicated by the splice point indication to exceed the predetermined threshold leads to seamless splicing.

It is noted that the buffering period SEI example given above contains indication 99, concatenation flag 95, and third CPB removal time 98. This denotes an example where both streams 14*a* and 14*b* carry the same sort of information data. In another example, this could be different.

The splice point indication 94, 94' can further comprise a flag 94 present at each of the picture portions or each of a set of picture portions, for example no RAPs, indicating whether for the respective picture portions the temporal difference $t_{rm}\#\text{-}t_{af}\#$ between the final CPB arrival thereof and the CPB removal thereof exceeds the predetermined threshold or not.

Alternatively or in addition the splice point indication 94, 94' can further comprise a flag 94' present at each of the picture portions or each of a set of picture portions, for example in those picture portions which are no RAPs, which flag indicates whether for each from the respective picture portion onwards up to a next first-type picture portion the temporal difference $t_{rm}\#\text{-}t_{af}\#$ between the final CPB arrival thereof and the CPB removal thereof exceeds the predetermined threshold.

The sequence of picture portions can further have the pictures of the video 12*a* encoded thereinto using temporal inter prediction 90 such as motion compensated prediction in a manner so that the picture portions comprise non-discardable picture portions, which are shown non-underlined in some figures, such as FIG. 25, and discardable picture portions, which are shown underlined therein.

These non-discardable picture portions are decodable in a stand-alone manner, while the discardable picture portions are not needed for decoding the non-discardable picture portions, but might need the non-discardable picture portions for being decodable themselves. It is noted that without the discardable picture portions being decoded it is possible to decode the video without any problem in the future.

That is, discardable picture portions do not serve, for instance, as reference pictures for the temporal inter prediction, while the non-discardable pictures may serve as reference pictures for the temporal inter prediction. A data stream coded using hierarchical temporal scalability represents an example for such picture portions: Picture portions for lowest (base) temporal layer may be non-discardable while others might be. Another example are open GOP coded data streams where RASL pictures may be discardable.

The video data stream 14*c* is spliced at a splice point 92 so that a predetermined picture portion 23*a'* for which the splice point indication 94; 94' indicates that the temporal difference $t_{rm}\#\text{-}t_{af}\#$ between the final CPB arrival thereof and the CPB removal thereof exceeds the predetermined threshold is followed by and abuts a first predetermined first type picture portion 23*b'* stemming from a spliced-in video data stream 14*b*.

The video data stream 14*c* comprises in the first predetermined first type picture portion a concatenation flag 96 and third timing information 98, compare AuCPBRemovalDelta or au_cp_removal_delay_delta_minus1. The concatenation flag 96 and third timing information 98 might have been present in the spliced-in data stream 14*b* already before the splicing, but the splicing apparatus might have re-set the flag 96 from the state indicating non-splicing to the state indicating splicing, and/or might have set the third timing information 98. That is, concatenation flag 96 is set to a first state indicating that the video data stream has been spliced at the first predetermined first type picture portion, and the third timing information indicates a third CPB removal time of the first predetermined first type picture portion 23*b*' which serves for determining a CPB removal time in case of splicing at the first predetermined first type picture portion 23*b*'. The third CPB removal time measures a lapsed time since a most recent CPB removal of a non-discardable picture portion. For example, since a removal of the most recent non-discardable picture portion of the video data stream being encoded in the spliced data stream 14*c*.

It might optionally be that each of the predetermined first type picture portions, which are shown cross-hatched in some figures, comprises a concatenation flag 96 and third timing information 98, the concatenation flag being settable to a first and a second state, the second state indicating that the video data stream has not been spliced at the respective predetermined first type picture portion.

A video encoder according to this embodiment could encode a video into a video data stream in the following manner. Imagine, for instance, such an encoder would encoder data stream 14*a*. It could also be configured to encode data stream 14*b* which might be, as discussed above, construed the same. The encoder would perform the encoding so that the video data stream 14*a* comprises the sequence of picture portions 23*a*, each picture portion having a picture 10*a* of the video 12*a* encoded thereinto. The video encoder then could classify the picture portions into the first type picture portions serving as CPB removal time references and second type picture portions as discussed above. The encoder can provide the video data stream with the first and second timing information, and check for each of predetermined picture portions (these can for example include discardable picture portions, for instance) whether the temporal difference between a final CPB arrival thereof and a CPB removal thereof exceeds a predetermined threshold. If so, that the respective predetermined picture portion may serve as the last picture portion before a splice point 92 with another video data stream 14*b*.

The video encoder further can provide the video data stream 14*a* with the splice point indication 94, 94'.

The video encoder can further, for each predetermined picture portion, use as the predetermined threshold a value determined based the second CPB removal time of a most recent first type predetermined picture before the respective predetermined picture portion, for example the simply hatched one in some of the figures which precedes 23*a'*.

The video encoder can also, for each predetermined picture portion, use as the predetermined threshold a value determined based on a maximum second CPB removal time value and write an indication 99 of the maximum second CPB removal time value into a most recent first type predetermined picture before the respective predetermined picture portion, for example the simply hatched one in the figure which precedes 23*a'*.

The following attends to inspecting as to how a spliced data stream as discussed above might be handled inside a decoder such as by an HRD 46 inside the same or, alternatively speaking, by an apparatus 46 for managing the CPB 48 of a video decoder 44 which, in turn, decodes video data stream 14*c* in a manner buffered by the CPB, i.e. in a manner receiving the picture portions via the CPB at the removal times with the picture portions reaching the CPB completely at the afore-mentioned final arrival times. This apparatus could check whether the concatenation flag 96 in the first predetermined first type picture portion 23*b*' indicates that a spliced-in took place at the first predetermined first type picture portion. The apparatus then can determine a time to remove the first predetermined first type picture portion 23*b*' from the CPB.

The time to remove can be determined based on the first timing information 95 of the first predetermined first type picture portion 23*b*', if the concatenation flag in the first predetermined first type picture portion indicates that no splice-in took place at the first predetermined first type picture portion.

And the time to remove can be determined based on the second timing information of the first predetermined first type picture portion 23*b*', e.g. initial_removal_delay, and the third timing information 98 of the first predetermined first type picture portion, if the concatenation flag 96 in the first predetermined first type picture portion indicates that a splice-in took place at the first predetermined first type picture portion.

Optionally, the apparatus can do this by determining a maximum between a most recent CPB removal of a non-discardable picture portion plus the third CPB removal time of the first predetermined first type picture portion, and a CPB removal of the predetermined picture portion 23*a*' which is followed by and abuts the first predetermined first type picture portion plus the second CPB time minus the temporal difference $t_{rm}\#-t_{af}\#$ between the final CPB arrival and the CPB removal of the predetermined picture portion 23*a*'. This time is then used to remove the first predetermined first type picture portion 23*b*' from the CPB.

Also according to this embodiment, an apparatus is described, namely the one depicted in FIG. 25, which is for splicing together two video data streams, here 14*a* and 14*b* to yield 14*c*. Each is as described above, such that each comprises a sequence of picture portions 23*a,b*, each picture portion having a picture 12*a,b* of a video 12*a,b* encoded thereinto.

The picture portions are also as described above, comprising first and second type picture portions, first and second timing information.

The second video data stream then would comprise the concatenation flag 96 and third timing information 98 in a first predetermined first type picture portion. The concatenation flag 96 is set to the second state indicative of the second video data stream the first predetermined first type picture portion continues the second video data stream, and the third timing information indicates a third CPB removal time of the first predetermined first type picture portion which serves for determining a CPB removal time when splicing-in the second video data stream at the first predetermined first type picture portion, the third CPB removal time measuring a lapsed time since a most recent CPB removal of a non-discardable picture portion.

The apparatus then can check whether a splice point indication 94; 94' in the first video data stream indicates for a predetermined picture portion, for example no RAPs, that a temporal difference between a CPB arrival thereof and a CPB removal thereof exceeds a predetermined threshold, so that same may serve as a last picture portion before the first video data stream is to be spliced with the second video data stream.

For example, in one variant, the predetermined threshold has been determined based on the intial_removal_delay of the Buffering SEI of the first stream 14*a* or based on a max_val_initial_removal_delay_for_seamless_splicing].

If the result of this check is positive, i.e. a "yes", the apparatus can set the concatenation flag 96 in the first predetermined first type picture portion of the second video data stream to a first state indicating that the second video data stream has been spliced-in at the first predetermined first type picture portion, and concatenate the first and second data stream at the predetermined picture portion 26*a*' and the first predetermined first type picture portion 26*b*', respectively, so as to obtain a spliced video data stream.

Also, if yes, the apparatus can rewrite the third timing information 98 so as to measure a lapsed time since a most recent CPB removal of a non-discardable picture portion of the first video data stream within the spliced video data stream, instead of within the second video data stream.

Moreover, if yes, the apparatus can further check whether a lapsed time since a most recent CPB removal of a non-discardable picture portion before the first predetermined first type picture portion changed when considering the spliced video data stream compared to the second video data stream, and if so, rewrite the third timing information 98 so as to measuring a lapsed time since a most recent CPB removal of a non-discardable picture portion of the first video data stream within the spliced video data stream.

Generally, the apparatus can also check the following checks, and perform the setting and concatenation if both checks reveal yes.

First, whether an upper limit equal to, or determined from, a second CPB removal time of a most recent first type predetermined picture portion of the first video data stream 14*a* before the respective predetermined picture portion is larger than the second CPB removal time of the first predetermined first type picture portion 23*b*' of the second video data stream.

The most recent first type predetermined picture portion of the first stream 14*a* is shown simply hatched in some figures.

The second CPB removal time of the most recent first type predetermined picture portion could also have an added CPB feeding deferral time for the most recent first type predetermined picture portion. This measures a lapsed time at which the CPB arrival of a first bit of the most recent first type predetermined picture portion is to be delayed.

The respective predetermined picture portion is for example the simply hatched one in some of the figures, which precedes 23*a*'.

The second check is whether a maximum second CPB removal time value 99 indicated in the most recent first type predetermined picture portion is larger than the second CPB removal time of the first predetermined first type picture portion 23*b*' of the second video data stream.

For example, in one variant, the predetermined threshold could be just the intial_removal_delay of the Buffering SEI of the first stream. Alternatively, the threshold is initial_removal_delay+initial_removal_delay_offset, i.e. CPB feeding deferral time. Further alternatively, as described in a second option, a maximum value could be sent max_val_initial_removal_delay_for_seamless_splicing.

For example, the AuCPBRemovalDelta needs to be rewritten only if the original value, which is the distance to non-discardable picture in the original second bitstream 14*b* is different to the distance at the spliced bitstream 14*c*.

For instance, it could be assumed that both bitstreams have the same framerate and that the following bitstreams, which are shown in decoding order, are concatenated, i.e. spliced:

2nd bitstream: RAP1, B0, B1 (non-discardable), B2, RAP2 (splicing_point)

1st bitstream: rap1, b0 (non-discardable), b1, b2, b3, b4

Spliced together:

rap1, b0 (non-discardable), b1, b2, b3, RAP2 (splicing_point)

Originally the buffering period SEI of RAP2 would contain a concatenation_flag set to 0 and AuCPBRemovalDelta equal to 2/framerate.

In the spliced bitstream, the concatenation_flag would be set to 1 and AuCPBRemovalDelta would equal 4/framerate.

However, if the spliced bitstream was rap1, b0 (non-discardable), b1, RAP2 (splicing_point), the concatenation_flag is set to 1 and AuCPBRemovalDelta equals 2/framerate.

Therefore, the first case may use rewriting the AuCPBRemovalDelta but the second case does not.

For streams that are spliced that contain an initial removal delay smaller than max_val_initial_removal_delay_for_seamless_splicing, a seamless splice can be achieved if the flag at the picture timing SEI says so. If the initial removal delay of the spliced stream is higher, obviously it is not feasible to know whether it is spliceable.

The above embodiments related to the question of enabling splicing at non-discardable points, while the following description attends to the issue of how to enable to render available removal times also available for removable picture portion such as DRAPs. In particular, subsequent embodiments relate to providing timing information (removal time) for the case were dropping of some AUs is performed, such as for the case of RASL picture for Open GOP structures when Random Access is performed or an splicing operation is performed. In other words, whether Removal Time is also applicable for dependent random access point, DRAP, pictures.

The idea here is to modify the initial_removal time of the Buffering period SEI of the RAP. In the following different cases are discussed, and examples of the removal time of the AUs are given.

Figure 1:
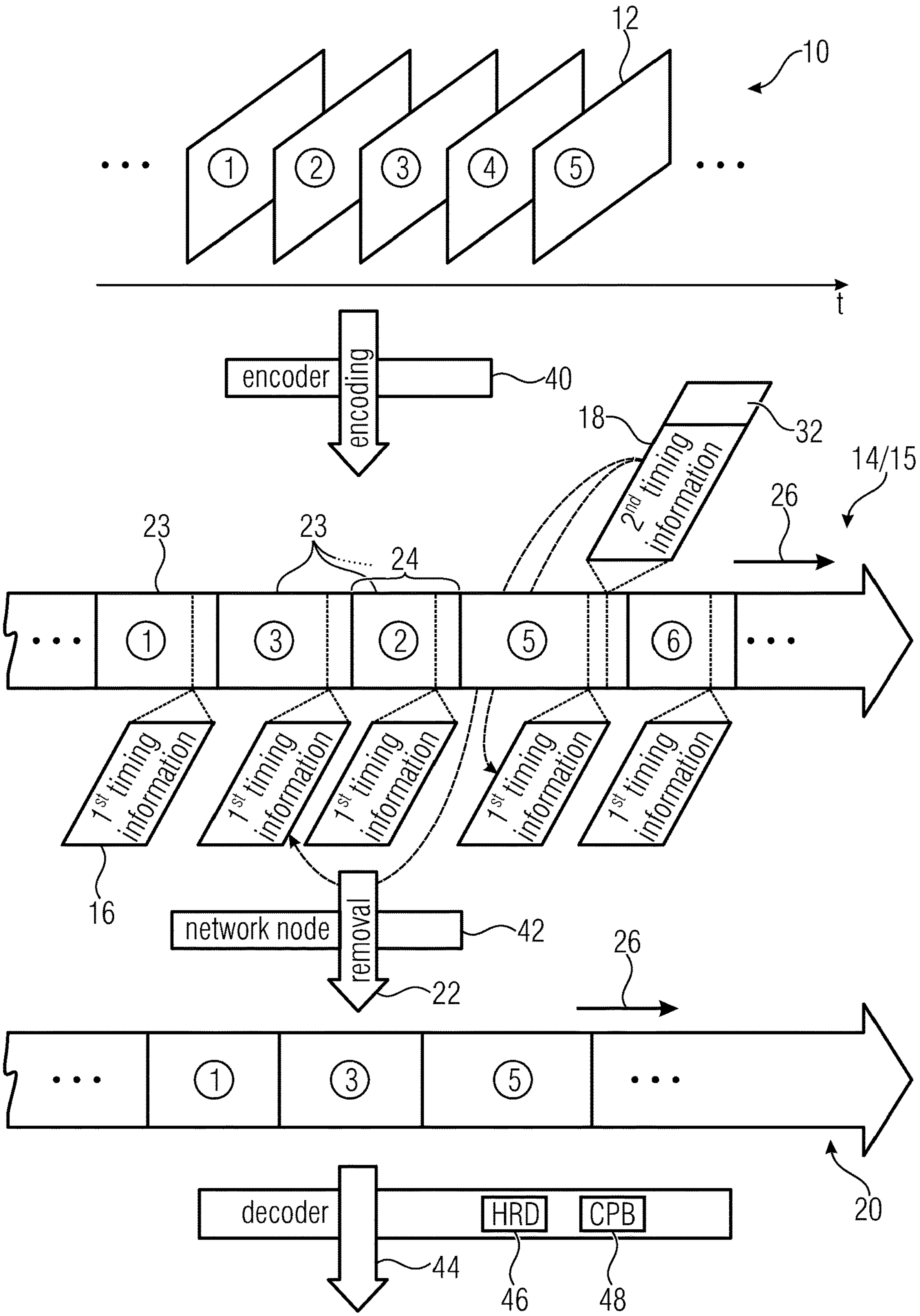
FIG. 1 shows encoded data streams according to one embodiment of the present application.
Figure 2:
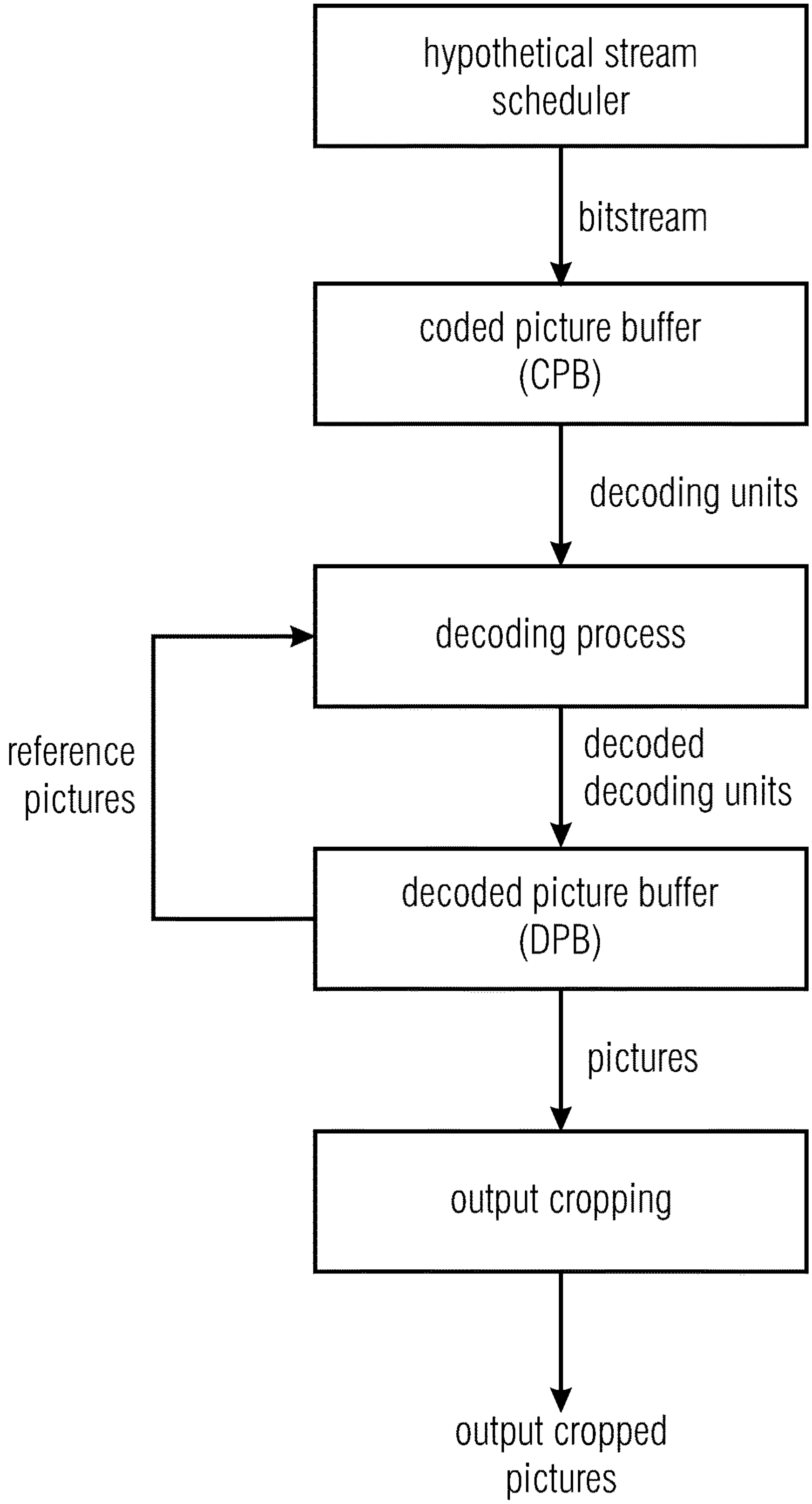
FIG. 2 shows a flow chart for a hypothetical reference decoder according to one embodiment of the present application.

FIG. 1 shows an inventive concept according to the present application. Therein is depicted a video data stream having a video 12 encoded thereinto and comprising first timing information 16 on first CPB removal times $t_{rm}^{(1)}$ to be applied at decoder side in case of buffering a complete version 15 of the video data stream 14, and second timing information 18 on second CPB removal times $t_{rm}^{(2)}$ to be applied at decoder side for buffering a reduced version 20 of the video data stream 14, differing from the video data stream by removal 22 of a portion 24 of the video data stream from the complete version of the video data stream.

Optionally, the second timing information 18 defines the second CPB removal times $t_{rm}^{(2)}$ by way of timing modification information on how to modify the first CPB removal times $t_{rm}^{(1)}$ to yield the second CPB removal times $t_{rm}^{(2)}$. An example for such timing modification information is for example init_removal_delay_correction_offset.

Further, the first timing information 16 can signal the first CPB removal times $t_{rm}^{(1)}$ on a picture by picture basis and by way of increments relative to a marked picture preceding in decoding order 26.

The increments can exemplary be signaled by AuCPBRemovalDelay or au_cpb_removal_delay_minus1. Marked Pictures can e.g. be at a clean random access point, CRA, and are pictures containing a buffering period SEI. They are typically RAP pictures but could be other pictures that is essential, e.g. Temporal Layer 0 pictures.

In other words, each picture portion 23 of the video data stream comprises an increment measuring the delay of its removal from the CPB 48 relative to the RAP picture the picture portion 23 of which precedes that picture portion along coding order 26. Picture portions 23 are called also access units, AUs, such as in case of HEVC.

Optionally, the marked picture is marked by way of a buffering period message in the video data stream within a picture portion which relates to the marked picture.

Further, an apparatus 46 for managing the CPB 48 of a video decoder 44 which decodes a video data stream can manage the CPB according to the first timing information 16 in case of the portion being comprised by the video data stream, and according to the second timing information 18 in case of the portion 24 having been removed.

Figure 5:
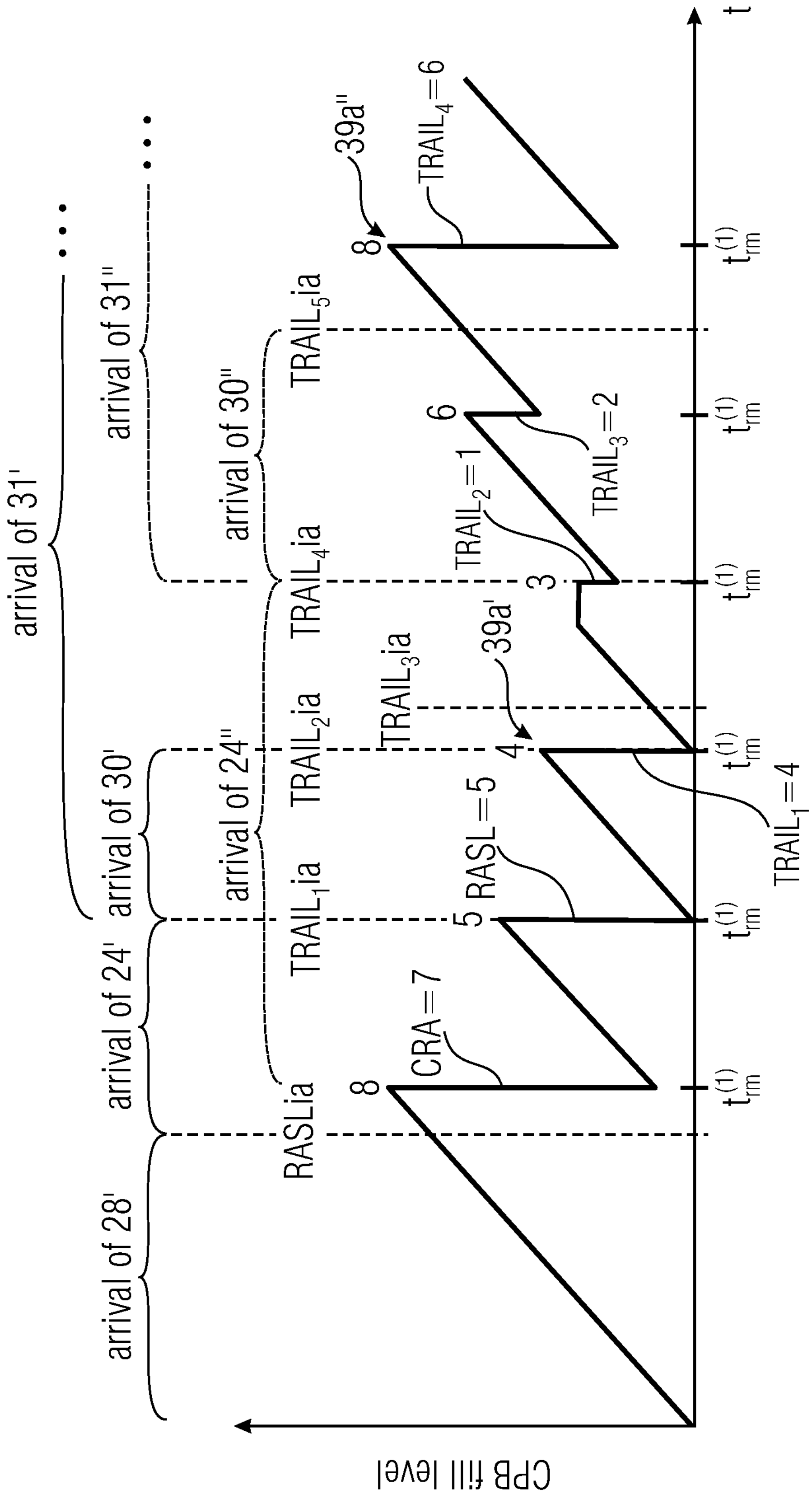

FIG. 5 shows a complete bitstream. Initial Removal Time of the clean random access point, CRA, is 8.

Figure 7:
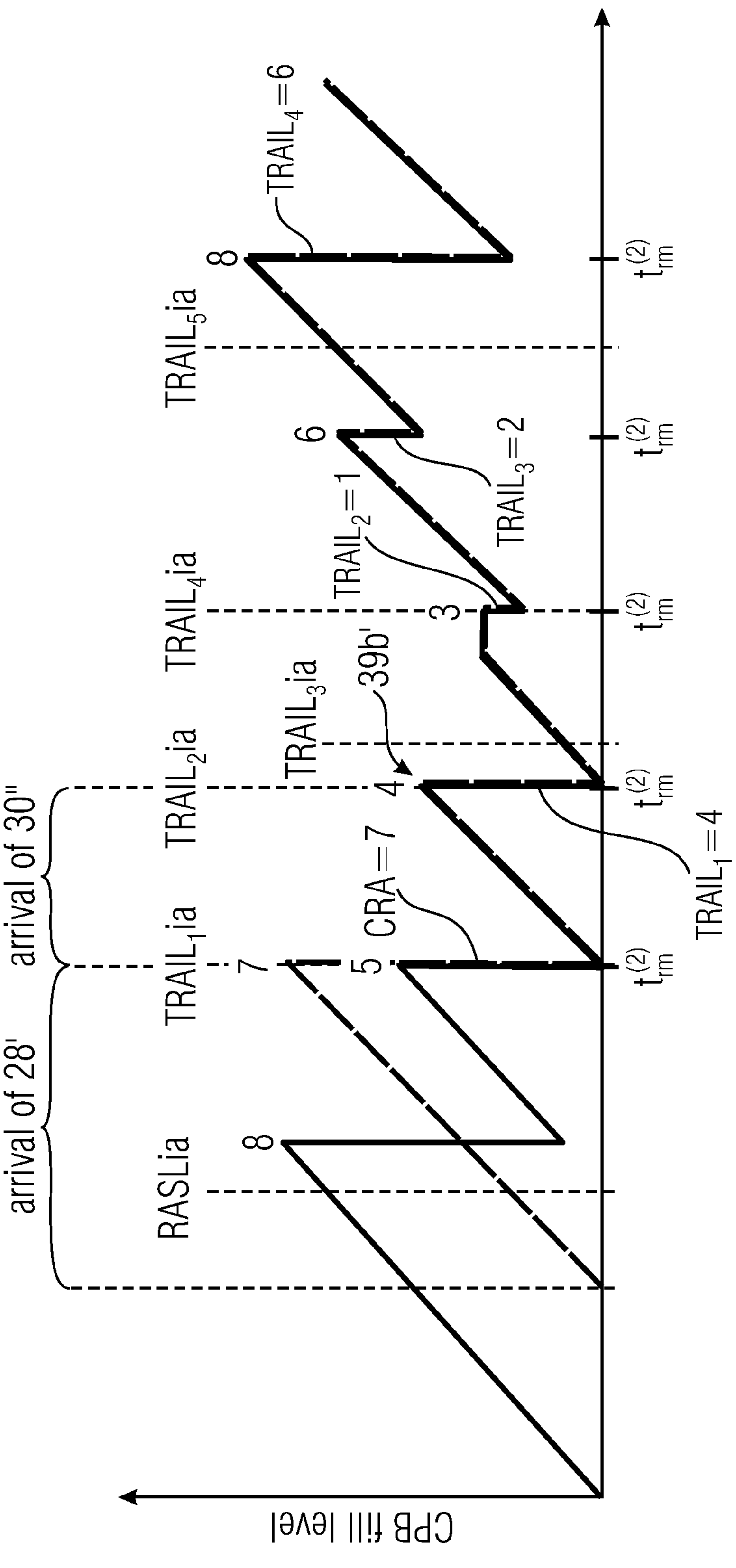

In FIG. 7, RASL pictures are removed. Initial Removal Time of the CRA is 7. The removal times of following pictures have a delta offset of 4 compared to the previous case.

Figure 6:
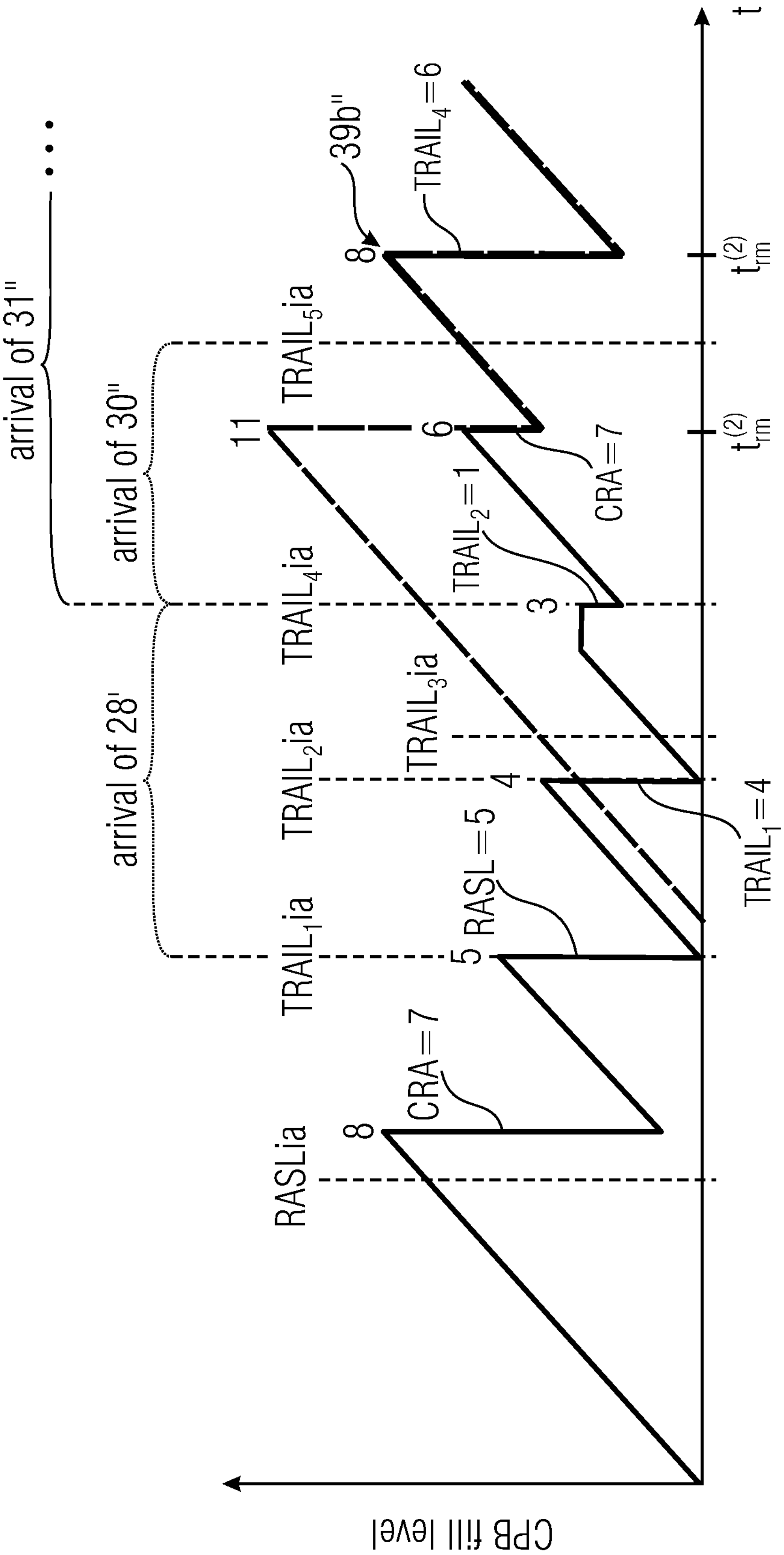

FIG. 6 shows RASL pictures removed and TRAIL (ordinary trailing) pictures up to (but excluding) $TRAIL_4$ which is a DRAP. Initial Removal of the CRA is 11 at this time so that the CPB level is the same as if the bitstream was there from the beginning.

One option would be to add alternative timings for the different possibilities of dropping frames. I.e. one for removing RASL pictures, one for removing up to first DRAP, one for removing up to second DRAP, and so on.

However, this would increase the size of the Buffering period SEI and would involve indicating to the receiver to which case it applies, i.e. are RASLs removed, all AUs up to first DRAP, all AUs up to second DRAP, etc. This could be done with a SEI.

However, it would also entail that the encoding is done of all DRAPs so that the buffering SEI can be properly written, which would cause an additional delay at the encoder/sender side.

Alternatively, a single value is indicated at the Buffering SEI message, and this can be modified by subsequent SEI, e.g. Picture timing SEI message of the next non-removed AU. Then when removing of AUs is carried out, only setting the flag aus_since_rap_removed_flag would be needed. An example therefor can be seen in FIG. 8.

Therein, in combination with the above mentioned figures, it can be seen that the second timing information 18 can define the second CPB removal times $t_{rm}^{(2)}$ by way of first timing modification information 19 on how to modify, or by way of first timing substitute information for substituting, the first CPB removal times $t_{rm}^{(1)}$ indicated by the first timing information with respect to a first picture portion 28' of the video data stream relating to a first predetermined picture CRA and preceding the portion 24' in the video data stream to yield the second CPB removal times $t_{rm}^{(2)}$ with respect to the first picture portion 28'.

The first timing modification information 19 can e.g. be signaled by init_removal_delay_correction_offset.

Further, the first timing modification information 19 or the first timing substitute information is signaled in the video data stream within a second picture portion 30' of the video data stream following the portion 24' in the video data stream and relating to a second predetermined picture $TRAIL_1$.

It is noted that SEI messages could be handled as also being buffered in the CPB and, thus, may have to be taken into account in determining the first and second timing information. The first and second timing information may be computed and conveyed once for SEI messages which convey the first and second timing information being included and once for SEI messages being dropped.

Also, optionally, the second picture portion can comprise a signalization 32 indicating whether the portion has been removed or not.

And the first timing modification information 19 or the first timing substitute information can be signaled in the video data stream irrespective of the signalization 32 indicating that the portion has been removed or the signalization 32 indicating that the portions has not been removed.

The first predetermined picture can be a marked picture, e.g. an intra random access point, IRAP, or a dependent random access point, DRAP, picture, i.e. one which serves as timing reference, as detailed above.

Also, the second predetermined picture can be a TRAIL or DRAP picture.

Further, the second timing information 18 can define the second CPB removal times $t_{rm}^{(2)}$ additionally by way of second timing modification information 21 on how to modify the first CPB removal times $t_{rm}^{(1)}$ indicated by the first timing information with respect to a set of one or more third picture portions 31' of the video data stream which relate to third predetermined pictures, follow the portion 24' in the video data stream and comprise the second picture portion 28' to yield the second CPB removal times $t_{rm}^{(2)}$ with respect to the set of one or more third picture portions 30', and the second timing modification information 21 can be signaled in the video data stream within the second picture portion 30'.

The second timing modification information 21 can e.g. be signaled by cpb_removal_delay_offset.

The second picture portion can also comprise a signalization 32 indicating whether the portion has been removed or not, and the second timing modification information 21 can be signaled in the video data stream irrespective of the signalization 32 indicating that the portion has been removed or the signalization 32 indicating that the portions has not been removed.

It is an option that the set of one or more third picture portions 31' of the video data stream extends up to a fourth picture portion relating to a marked picture. Therein the marked picture could serve as a starting point for timing reference.

Finally, the marked picture can be marked by way of a buffering period message in the video data stream within a picture portion which relates to the marked picture.

Note that in the case shown for DRAP the Initial Removal of the CRA is 11 instead of 8 as when the full bitstream is considered and therebefore the CPB fill level is higher than in the original case. This could lead to potential problems and buffer overflows.

Another option would be to allow (in case of DRAPs) that the removal times from the CPB are not equidistant for all frames. More concretely for RAP and DRAP could have a non-equidistant distance and for all other AUs yes.

Figure 9:
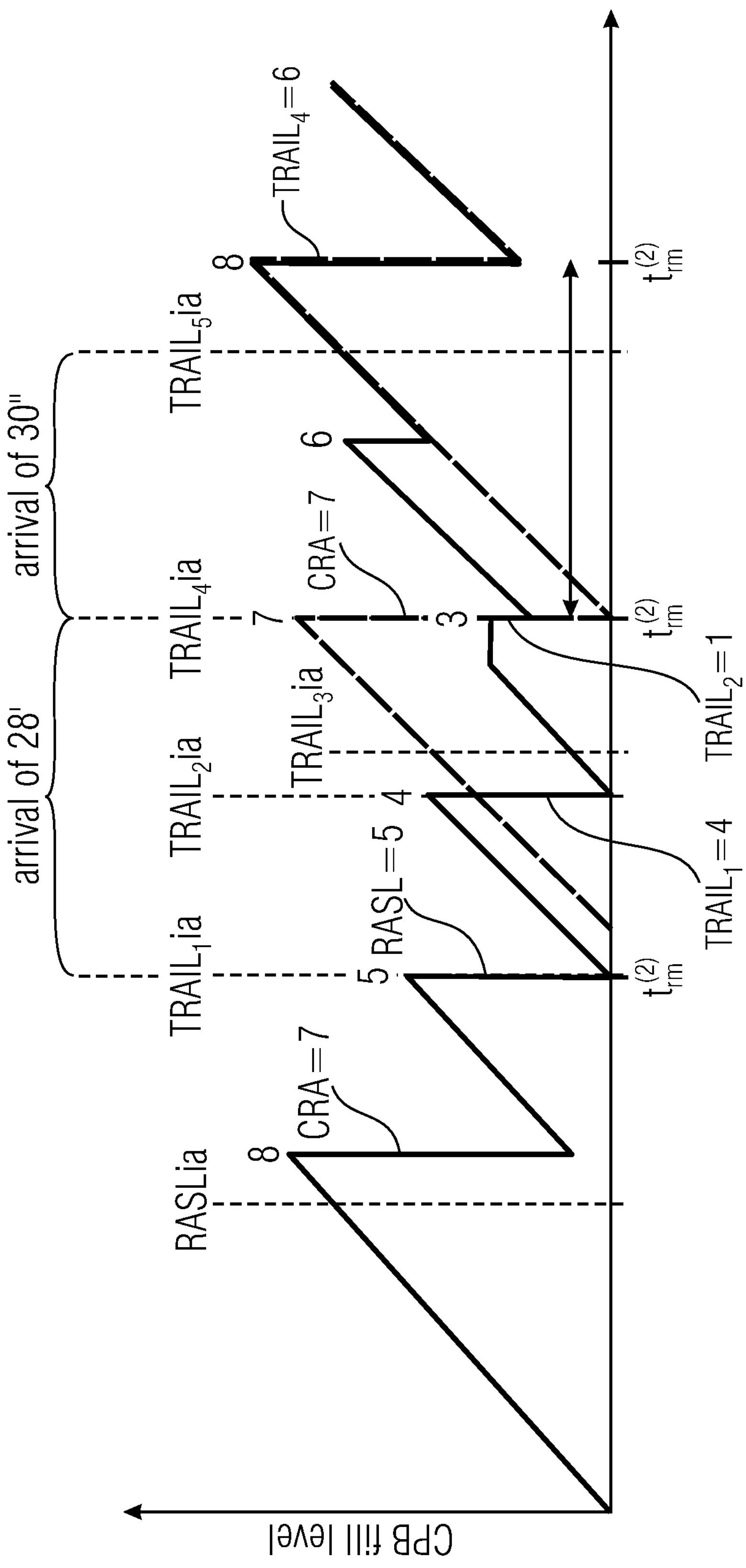

In that case, the Buffering period SEI message of the RAP could have two timings The one for the whole bitstream or when RASLs are removed and one for the DRAP case. Since in the second case the RAP is not output the removal time of the RAP could be such that the final arrival time of the RAP is equal to its removal time. Then the DRAP AU would have a second removal time that would build the buffer up to the desired level. In such a case the final arrival time of the RAP is the earliest arrival time of the DRAP in both CBR and VBR case. The described solution is illustrated in FIG. 9.

An exemplary signalling syntax is shown in FIGS. 10 and 11.

In an embodiment, the second timing information 18 can define the second CPB removal times $t_{rm}^{(2)}$ by way of third 33 and/or fourth 35 timing modification information, on how to modify, or by way of third 33 or fourth 35 timing substitute information.

The third timing modification/substitute information 33 is on how to modify or substitute the first CPB removal times $t_{rm}^{(1)}$ indicated by the first timing information with respect to a first picture portion 28' of the video data stream relating to a first predetermined picture CRA and preceding the portion 24" in the video data stream to yield the second CPB removal times $t_{rm}^{(2)}$ with respect to the first picture portion 28'.

The third timing modification/substitute information 33 can e.g. be signaled by drap_operation_initial_removal_delay. It should also be noted that cpb_drap_operation_removal_offset pertains to arrival times, i.e times at which a certain picture portion, namely the marked picture marked by way of the buffering SEI message, enters or is fed to into the CPB. The feeding may fall into the responsibility of an apparatus different from apparatus for managing the CPB as described in this application. It might be up to a transmitting intermediate network node to adhere to the arrival times.

The fourth timing modification/substitute information 35 is on how to modify or substitute the first CPB removal times $t_{rm}^{(1)}$ indicated by the first timing information with respect to a set of one or more third picture portions 31" of the video data stream which relate to third predetermined pictures and follow the portion 24" in the video data stream to yield the second CPB removal times $t_{rm}^{(2)}$ with respect to the set of one or more third picture portions 30".

The fourth timing modification/substitute information 35 can e.g. be signaled by cpb_drap_operation_removal_delay_ offset.

Generally, also an apparatus 46 for managing the CPB 48 of a video decoder can perform the modification or substitution detailed above.

Optionally, the third timing modification/substitute information 33 can be signaled in the video data stream within the first picture portion 28' of the video data stream, and the fourth timing modification/substitute information 35 can be signaled in the video data stream within a second picture portion 30" of the video data stream leading in terms of coding order 26 among the set of one or more third picture portions.

Further, the first picture portion 28' can comprise a signalization 36 indicating whether a distance between the second CPB removal times of the first and second picture portions is allowed to deviate from a distance between the second CPB removal times of consecutive pairs of the second and third picture portions, with the third timing modification information 33 or the third timing substitute information 33 being signaled in the video data stream within the first picture portion 28' of the video data stream conditionally upon the signalization 36 indicating that the distance between the second CPB removal times of the first and second picture portions is allowed to deviate from the distance between the second CPB removal times of consecutive pairs of the second and third picture portions.

A video encoder can check whether the second predetermined picture is a DRAP referencing the first predetermined picture which is a RAP, set the signalization 36 so as to indicate whether the second predetermined picture is a DRAP referencing the first predetermined picture which is a RAP and encode the third timing modification/substitute information 33 in the video data stream within the first picture portion 28' of the video data stream if the second predetermined picture is a DRAP referencing the first predetermined picture which is a RAP.

It is noted, that usually au_cpb_removal_delay_minus1 in the pic_timing SEI messages constantly increases between consecutive picture portions, i.e. constantly increases with same distance. But in the case of leaving away or not presenting or outputting the picture coded into the first picture portion 28', then it is acceptable if the regular temporal distance is interrupted till the DRAP and then valid from that onwards, as these are the pictures actually output. In other words, in the examples au_cpb_removal_delay_minus1 in the pic_timing SEI messages constantly increases with same distance. Typically this is the case but it is not prohibited that this is the not case. Examples illustrate the case where this is originally the case in the full bitstream without removing anything. However, when removing everything between RAP and DRAP this is not anymore the case, but is ok since in case of using the DRAP functionality the RAP is not output or shown at all.

Further, the second picture portion 30" can comprise a signalization 38 indicating whether the portion 24' has been removed or not.

An apparatus 46 for managing the CPB 48 of a video decoder 44 according to the invention can defer a removal of the first picture portion of the video data stream after inspection of the signalization 32; 38.

Alternatively, a network node 42 for forwarding a video data stream according to the invention can set the signalization 32; 36 so as to indicate that the portion is removed from the video data stream.

The network node 42 can also remove, i.e. drop the portion 24 of the video data stream from the video data stream.

As can be seen in FIG. 5, optionally, the second timing information can define the second CPB removal times so that a first CPB fill level 39*a*'; 39*a*" at the decoder side manifesting itself at the decoder side after buffering a first picture portion of the video data stream preceding the portion in the video data stream, the portion and a second picture portion of the video data stream following the portion in the video data stream when performing buffer removal of the second picture portion according to the first CPB removal times is equal to a second CPB fill level 39*b*'; 39*b*" at the decoder side manifesting itself at the decoder side after buffering the first and second picture portions of the video data stream when performing buffer removal of the second picture portion according to the second CPB buffer times with the portion not having been buffered.

A video encoder can set the first and second timing information so that the video data stream is in accordance with the above.

More generally, the second timing information can define the second CPB removal times either for the portion relating to a sequence of one or more RASL pictures, or for the portion relating to a sequence of pictures preceding a certain DRAP.

Also, the video data stream can comprise a signalization 32, 35 indicating whether the portion has been removed or not.

The offset of the DRAP used for Random Access would be used in the computation of the removal times of following AUs. Obviously, alternatively to indicating the offsets in the picture timing SEI messages it could be mandated that DRAPs include a Buffering Period SEI message and that those offsets are indicated into the Buffering Period SEI message.

An issue which the subsequently described embodiments attend to, is temporal scalability and the question of how to indicate in such coding environment information concerning the picture buffer timings in the picture timing SEI and buffering period SEI messages. Accordingly, embodiments referring to alternative information in the picture for temporal scalability in Picture Timing SEI messages and Buffering Period SEI messages are described. We start with a presentation of embodiments referring to alternative information in the picture for temporal scalability in Picture Timing SEI messages and Buffering Period SEI messages, namely ones making use of an offset for Timing in Picture Timing SEI messages.

Figure 12:
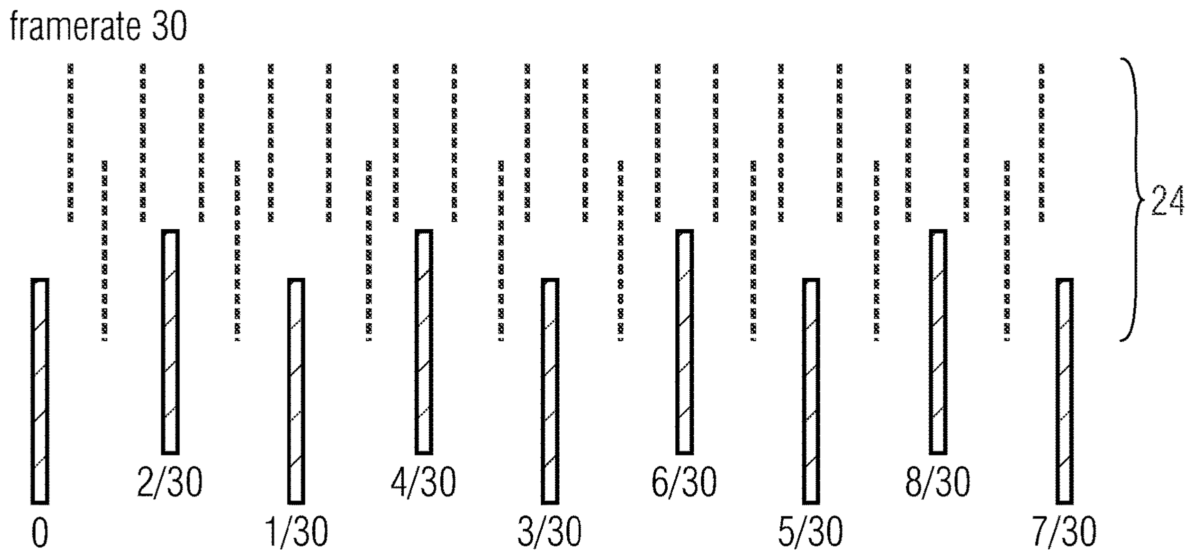
FIGS. 12 to 14, 16, and 18 show data stream structures for different framerates according to embodiments of the present application.
Figure 13:
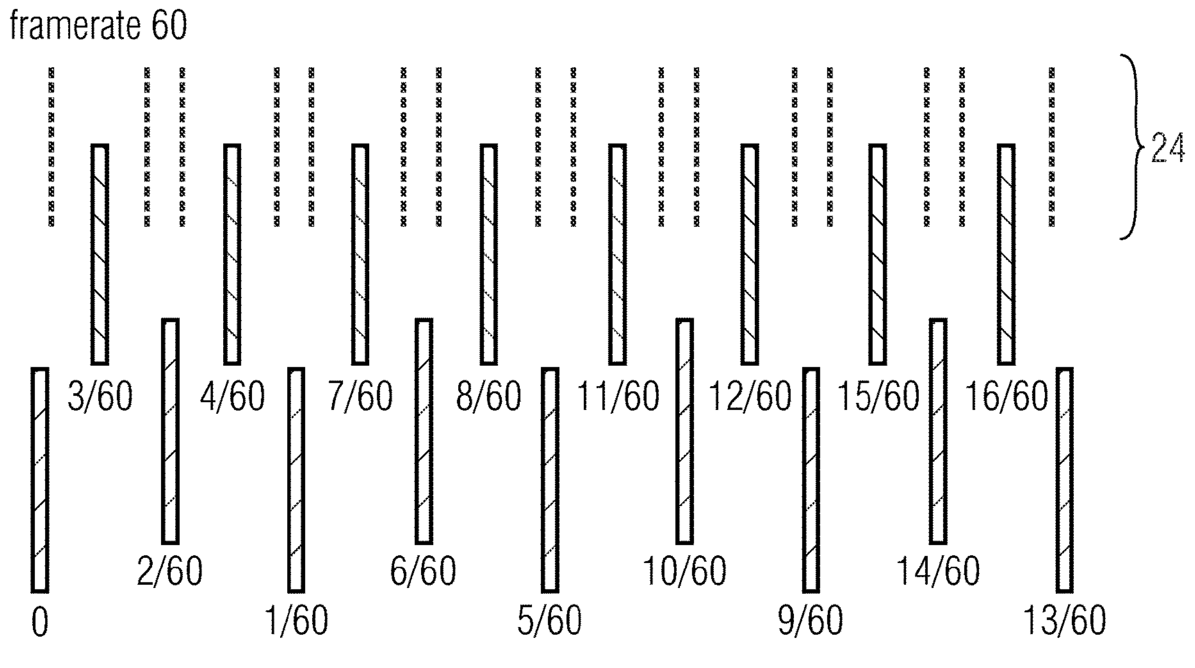
Figure 14:
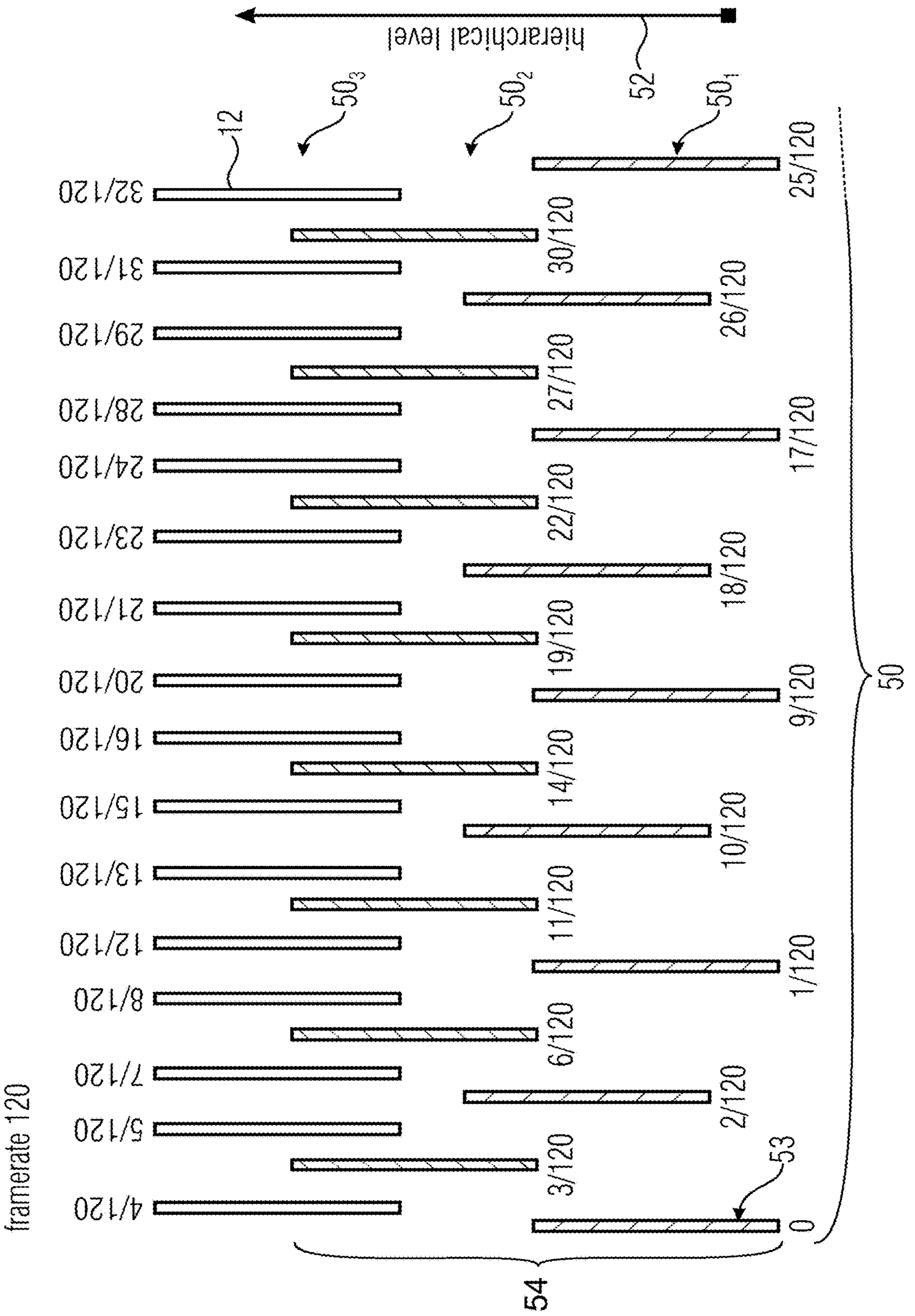

FIGS. 12 to 14 show some examples of the removal time values when different frame rates are offered with the same bitstream (i.e. temporal scalability).

The table in FIG. 17 shows that the deltaTimes for frames "blue" are 0, 1/60, 3/120, 2/60 and 6/120. For "red frames" 3/120 and 6/120. Blue frames are referred to by those lines in the table, which contain a value for 30, 60 and 120 fps. Red frames are referred to by those lines in the table, which only contain a value for 60 and 120 fps, but N/A for 30 fps.

Figure 16:
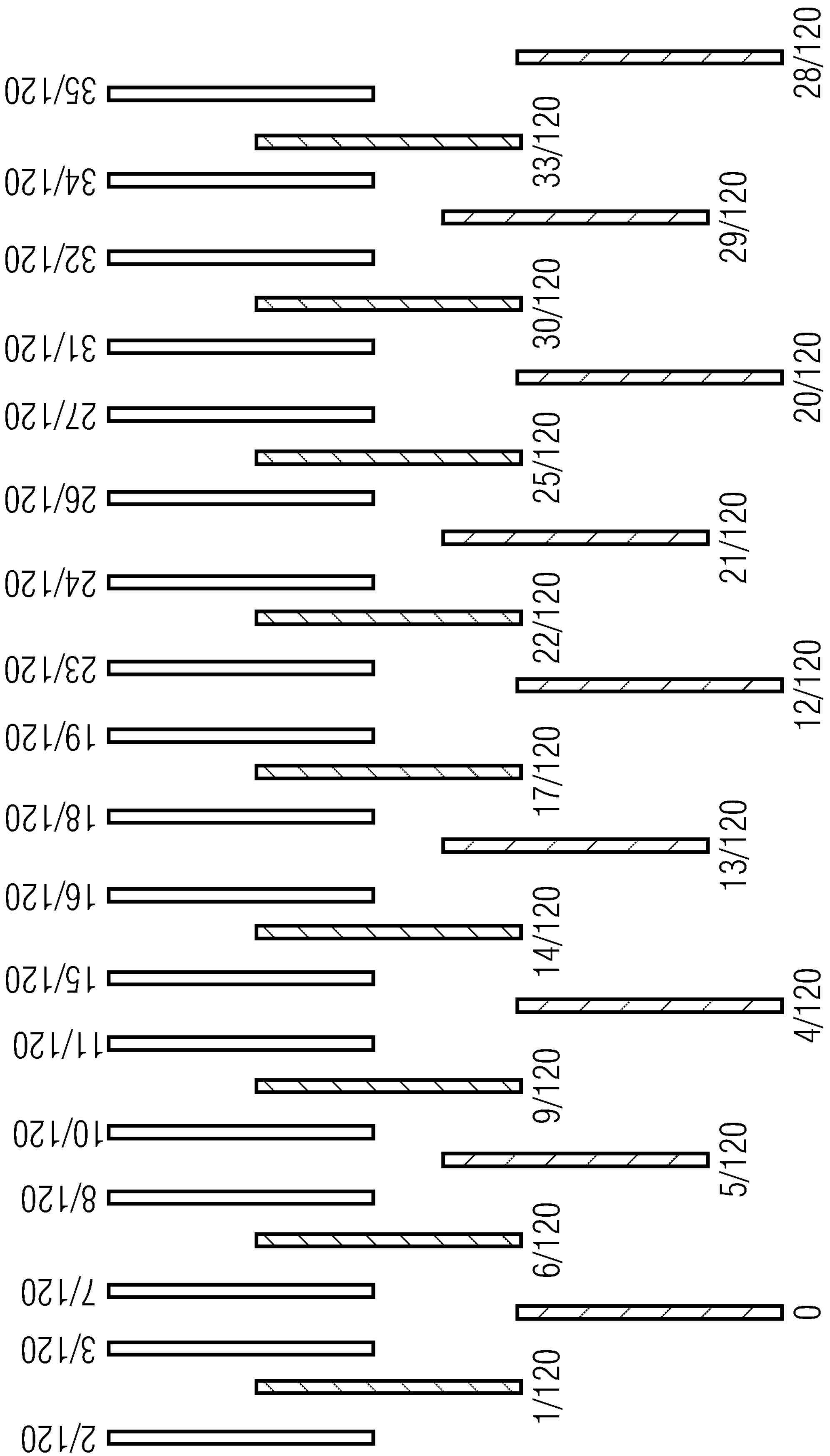

For open GOP cases, where the highest framerate is shown in FIG. 16, the following applies, also shown in FIG. 15. In the table of FIG. 15 it can be seen that the deltaTimes for frames "blue" are 0, 1/60 and 3/120. For "red frames" 1/120 and 2/120. Again, blue frames are referred to by those lines in the table, which contain a value for 30, 60 and 120 fps. Red frames are referred to by those lines in the table, which only contain a value for 60 and 120 fps, but N/A for 30 fps.

In summary, there are some patterns that repeat due to the GOP structure of the encoded bitstream in the deltaTimes of the removal time for different framerates.

Figure 18:
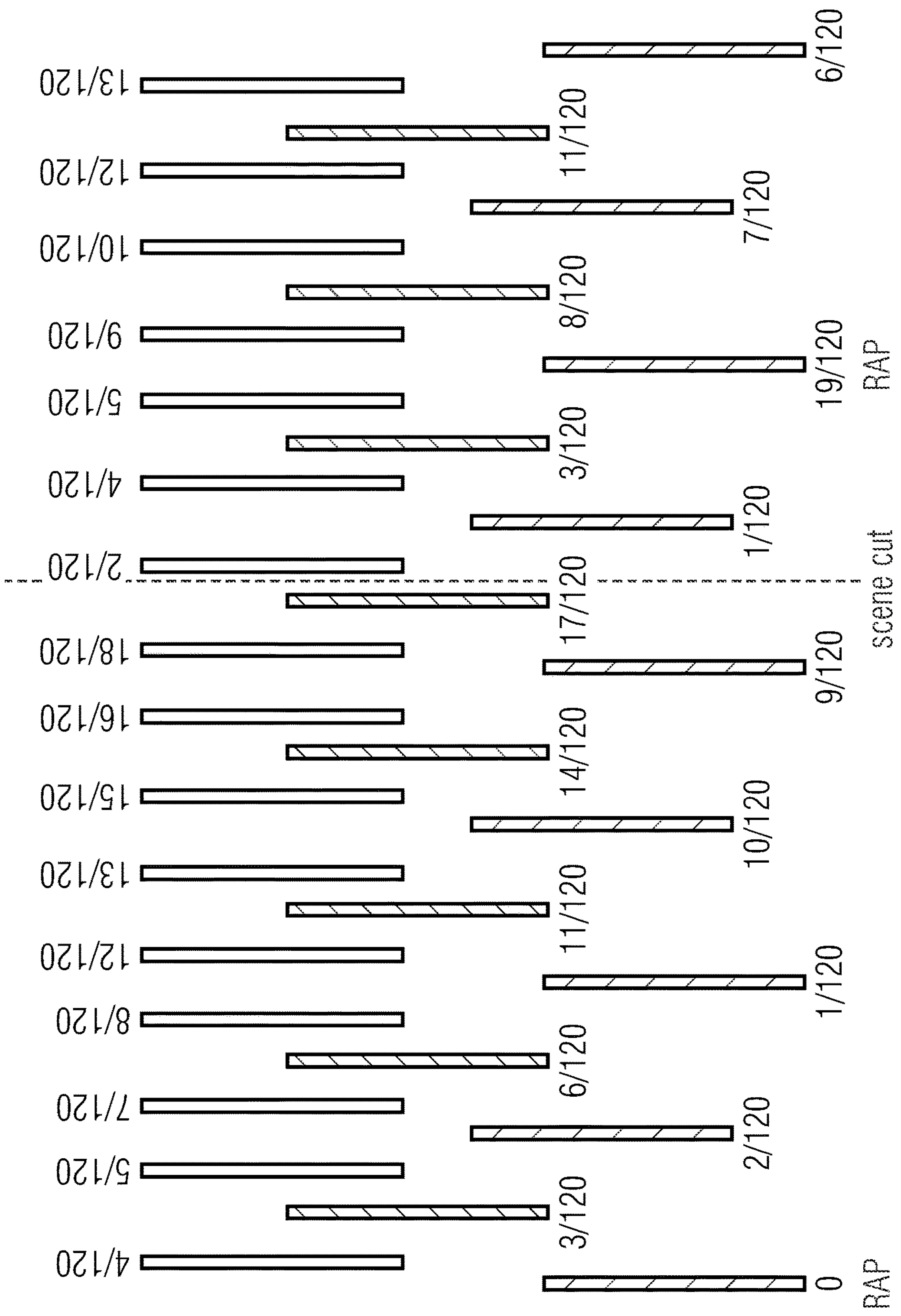

Another aspect that needs to be taken into account is scene cuts, since the described pattern is interrupted. Different positions for the scene cuts would lead to different values. Only one position is shown in FIG. 18 for simplicity.

As can be seen from the table in FIG. 19, obviously, the GOP which is affected by the scene cut does not follow the pattern.

FIG. 20 shows an exemplary signalling structure with reference to Picture timing SEI message containing different values for different framerate (i.e. target TemporalIds).

In an embodiment shown in FIG. 14, the video data stream is coded in units of groups 50 of pictures using temporal inter prediction in a temporally scalable manner so that the pictures 12 of the video are grouped into pictures of different hierarchical levels $\mathbf{50}_i$ with, for each hierarchical level, all pictures of the respective hierarchical level merely depending on pictures of the respective level or a lower hierarchical level. In the figures only a starting portion of one GOP is shown.

Also, the portion 24 is composed of pictures belonging to a highest hierarchical level $\mathbf{50}_3$ or to the highest hierarchical level $\mathbf{50}_3$ and one or more hierarchical levels $\mathbf{50}_2$ except a lowest hierarchical level $\mathbf{50}_1$ immediately below the highest hierarchical level $\mathbf{50}_3$ in hierarchical order 52.

Then the first timing information 16 signals the first CPB removal times $t_{rm}^{(1)}$ on a picture by picture basis and by way of increments relative to a leading marked picture 53 of a current group of pictures in decoding order. This order is indicated by the sequential order of the fractional values using which the pictures are labelled.

Again, the increments can exemplary be signaled by AuCPBRemovalDelay or au_cpb_removal_delay_minus1. The current GOP are pictures with respect to the leading picture of the GOP the respective picture is part of.

Further, the marked picture can be marked by way of a buffering period message in the video data stream within a picture portion which relates to the marked picture.

In one embodiment the second timing information 18 can define the second CPB removal times $t_{rm}^{(2)}$ by way of fifth timing modification information 19 or fifth timing substitution information 19 for substituting which is signaled in the video data stream within each of fifth picture portions 23 of the video data stream which relate to fifth pictures 54 which are associated with one or more hierarchical levels other than the highest hierarchical level.

The fifth timing modification information 19 can e.g. be signaled by au_cpb_removal_pattern_offset, and fifth timing substitution information 19 can e.g. be signaled by au_cpb_removal_delay_minus1[i] for i being unequal to the current hierarchical level to which the picture for pic_timing is sent belongs to.

The fifth timing modification/substitution information 19 is on how to modify or substitute the first CPB removal times $t_{rm}^{(1)}$ indicated by the first timing information with respect to the respective fifth picture portion 23 to yield the second CPB removal times $t_{rm}^{(2)}$ with respect to the fifth picture portion 23.

The first timing information can e.g. be signaled by au_cpb_removal_delay_minus1[i] for i being equal to the current hierarchical level to which the picture for pic_timing is sent belongs to, or au_cpb_removal_delay_minus1.

In case that the portion 24 comprises the highest hierarchical level down to the respective hierarchical level above the respective hierarchical level, the fifth timing modification/substitution information 19 is signaled per hierarchical level between the highest and the lowest hierarchical level, i.e. $\mathbf{50}_1$ and $\mathbf{50}_2$ in the example shown, and for each hierarchical level between the highest and the lowest hierarchical level which is above the respective hierarchical level, i.e. $\mathbf{50}_3$ for $\mathbf{50}_2$ and $\mathbf{50}_3$ and $\mathbf{50}_2$ for $\mathbf{50}_1$ in the example shown. As am example the number is indicated by num_sub_layer_cpb_removal_delays_minus1 in case of buffering_period_pattern_flag being one and num_sub_layer_cpb_removal_delays_minus1+1 in case of buffering_period_pattern_flag being zero.

FIGS. 21 and 22 show exemplary signalling structures, wherein alternatively, patterns can be defined within each Buffering period SEI and those can be indicated into the Picture Timing SEI message. When as described above, e.g. as a reason of scene cuts, no pattern can be applied, the values can be signalled explicitly (or in some form of offset).

According to this embodiment, the second timing information 18 defines the second CPB removal times $t_{rm}^{(2)}$ by way of the fifth timing modification information 19, e.g. au_cpb_removal_pattern_offset. The fifth timing modification information 19 indicates how to modify the first CPB removal times by way of offset values, and the video data stream comprises data 60 indicating a list of representative offset values assumed by the offset values indicated by the fifth modification information for modifying the first CPB removal times in one or more groups of pictures. Then the fifth timing modification information 19 signals the offset values by way of pointers pointing into the list of representative offset values.

More generally, in the above embodiments, the video data stream is reduced by the portion 24, i.e. thereof results the reduced version 20, and the video data stream comprises the first and second timing information 18. In other words, the second timing information is not nested so as to be unnested and substitute the corresponding first timing information in case of dropping certain hierarchical levels at some intermediate network device. Rather the first and second timing information are left unchanged and on decoder side, the correct timing information is chosen for being used for CPB handling depending on a signaling sent in the video data stream and having been set be the intermediate network device which explains which portion has been removed, or, to be more precise, which of the erstwhile highest hierarchical levels have been removed/dropped.

Another example for the embodiment referring to alternative information in the picture for temporal scalability in Picture Timing SEI messages and Buffering Period SEI messages is a delta at Buffering Period SEI messages.

Different values of vcl_initial_cpb_removal_delay[i] and vcl_initial_cpb_removal_offset[i], as can be seen in FIG. 23, should obviously also be indicated into the Buffering period SEI message as a single one could not be enough for all possible framerates.

Another embodiment refers to multiple bitrate considerations. As discussed above, the current way of supporting different transmission rates or CPB feeding rates is to indicate several values for Bitrates, CPBsizes and respective initial removal times and offsets.

The issue with this current solution is that all potential CPB feeding bitrates needs to be known beforehand and the rate control at the encoder needs to take into account all of them to ensure that the provided information is valid.

Although this allows to some extent a high flexibility, where the parameters mentioned can be changed in many ways, in some practical scenarios taking into account many potential CPB feeding rates could be desirable from the transmission side but would be difficult to implement at the encoder side. Under such circumstances a "quite" restrictive rate control could be of help where some parametrization of the HRD model would be done, meaning by that that 2 extremes maxBitrate and minBitrate would be considered and anything in between could be linearly interpolated. Such a solution would be more restrictive than the flexible solution in terms of HRD modelling but would allow at the transmission side to use any rate in between maxBitrate and minBitrate and still be sure that there would not be any underflow or overflow with CPBsizes and Initial removal times that can be computed based on the signalled values for the max and min values.

The hrd_parameters is split into 3 parts.

cbr_parameters_present_flag vbr_min_parameter_present_flag vbr_max_parameter_present_flag Any other Bitrate in between the two provided for vbr_min_parameter_present_flag and vbr_max_parameter_present_flag can be computed. An exemplary signalling is shown in FIGS. 24A, 29, and 30.

Similarly, the buffering period SEI message would contain values for CBR, min, and max if also present in the hrd_parameters, as shown in FIGS. 24B and 31.

According thereto, HRD timing information data, for example first HRD timing information data, second HRD timing information data or any of the plurality of HRD timing information data, and each HRD timing information data comprise one or more of the following:

- an indication 104 of the CPB feed bitrate the respective HRD timing information relates to,
- an indication 106 of a CPB size need for the respective CPB feed bitrate the respective HRD timing information relates to,
- an indication 108 of a CPB removal time for each of marked picture portions of the video data stream, measuring the lapsed time since a CPB arrival of a first bit of the respective marked picture portion for the respective CPB feed bitrate the respective HRD timing information relates to—the marked picture portions here are ones having a buffering period SEI such as RAPs, they are shown crosshatched in the other pertinent figures, but also other pictures such as simply-hatched ones in the other pertinent figures, respectively,
- an indication 110 of a CPB feeding deferral time for each of the marked picture portions of the video data stream, measuring a lapsed time at which the CPB arrival of a first bit of the respective marked picture portion is to be delayed for the respective CPB feed bitrate the respective HRD timing information relates to.

If there was the min and max values, any value in between would lead to, for instance, an linear interpolation of the min and max values.

Still, since in some cases the further flexibility of non-limiting the HRD model to a linear interpolation model might be desirable (e.g. reducing initial_removal_delay and increasing Bitrate not linearly). Therefore, depending on the scenario, the encoder could choose to select which mode to use, the one with the linear interpolation or the one with the multiple values. Exemplary signalling is shown in FIGS. 32, 33, and 34.

As shown in FIGS. 24A, 24B, 29, 31, 32, and 34 the video stream can comprise first HRD timing information data 70*a,b* relating to a minimum CPB feed bitrate, and second HRD timing information data 72*a,b* relating to a maximum CPB feed bitrate. The first HRD timing information data 70*a,b* and second HRD timing information data 72*a,b* then allow for a determination of third HRD timing information for an actual CPB feed bitrate by linearly interpolating between the first and second HRD timing information data. The actual CPB feed bitrate is for example the one at which the video data stream is actually fed into the CPB.

The video data stream can further comprise a flag 74, e.g. hrd_interpolation-mode_flag, indicative of whether the first HRD timing information data 70*a,b* and second HRD timing information data 72*a,b* is present or a plurality of HRD timing information data 76 relating to each of a wanted set of CPB feed bitrates.

A video encoder can then decide to provide the video data stream with the first HRD timing information 70 and the second HRD timing information 72 or to provide the video data stream with a plurality of HRD timing information data 76 relating to each of a wanted set of CPB feed bitrates.

The video encoder can optionally perform the decision based on a feasibility check whether the linear interpolation between the first and second HRD timing information leads to a CPB overflow and underflow free situation for all CPB feed bitrates between the minimum and maximum CPB feed bitrate.

An apparatus 46 for managing the CPB 48 of a video decoder 44 can then manage the CPB using the third HRD timing information.

Similarly, an apparatus can inspect the flag 74, e.g. hrd_interpolation-mode_flag, in the video data stream and, depending on the flag, perform the derivation of the first HRD timing information data 70*a,b* and second HRD timing information data 72*a,b* from the video data stream or derive a plurality of HRD timing information data 76 relating to each of a wanted set of CPB feed bitrates from the video data stream.

Figure 38:
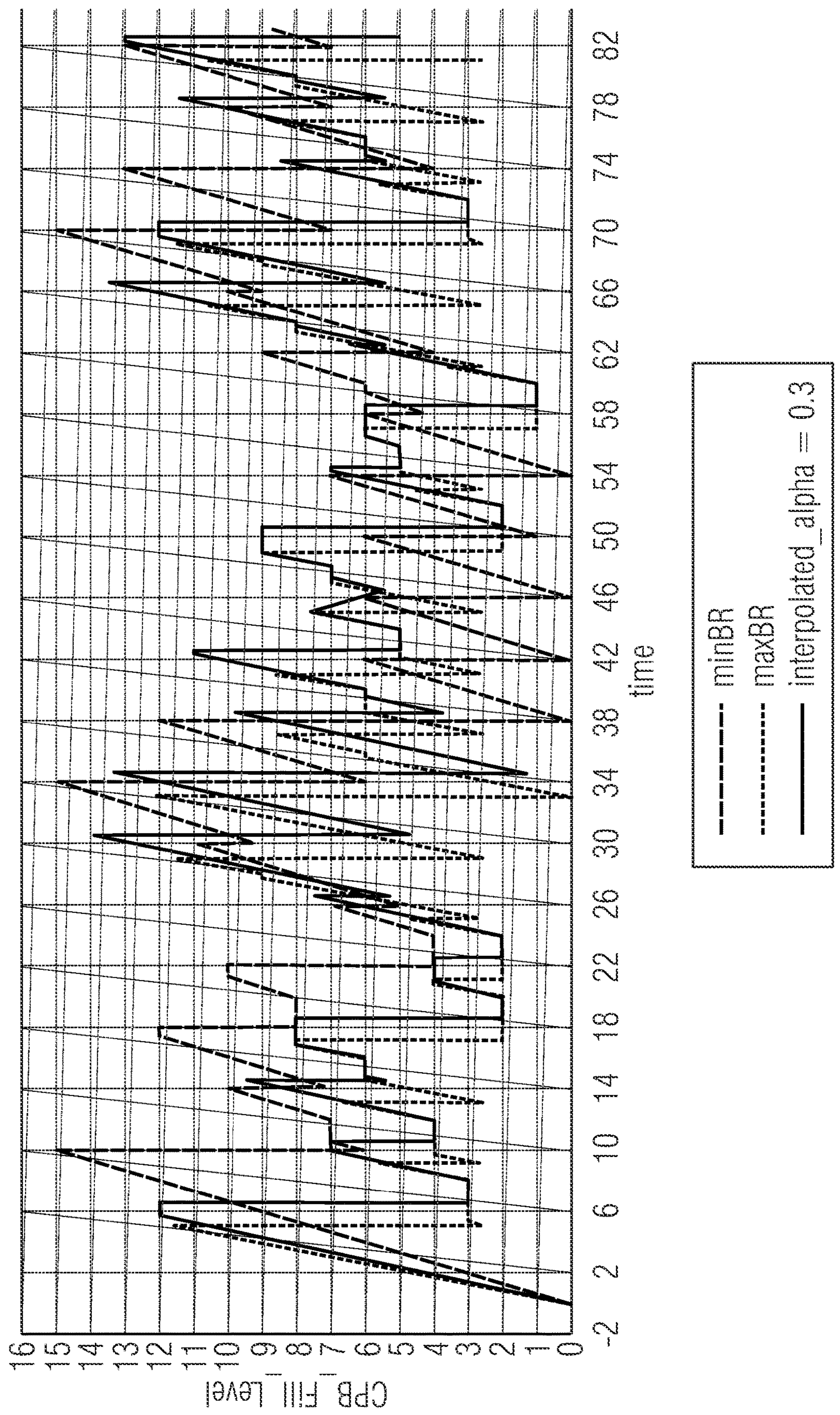
FIG. 38 shows a graph of exemplary CPB fill levels according to embodiments of the present application.

FIG. 38. shows an example for three operation points.

The interpolated case uses the following linear interpolation formula:

$$BR_{interpolated} = BR_{min} + (BR_{max} - BR_{min}) * \text{alpha}$$

$$IND_{interpolated} = IND_{min} + (IND_{max} - IND_{min}) * \text{alpha}$$

$$(\text{with } IND = InitialRemovalDelay)$$

Note that $IND_{min}$ (for the smallest Bitrate) is bigger than $IND_{max}$ (for the highest Bitrate)

FIG. 37 refers to $IND_{min}$, wherein the following abbreviations are used:

RmD=removal delay

Afinal=Arrival time final

ArrivalEar=Possible Arrival earliest time of the first bit of the pictures due to framerate ArrivalInit=Actual arrival time of the first bit of the picture It can be seen that the max CPB size is 15.

FIG. 36 refers to $IND_{max}$. And the CPB size that may be used for this second case is 12,1125.

For the computed Initial removal delay and Bitrate with an alpha of 0.3 linearly, FIG. 35 shows that the CPB size that may be used for this case is 13,87912. If the linear interpolation would be carried out the CPB size computed would correspond to 12,97875. As can be seen, that value is different.

Therefore, if the encoder would like to obey the constraint that the HRD parameters involved are to be derived linearly with full flexibility within the max and min values, the rate control at the encoder should take that into consideration when determining the sizes of the pictures so that the CPB size limits when interpolating are fulfilled.

Since this is not always possible, one option would be to signal only if the encoders take care of it that interpolation is possible and if not signal whatever real values have been used in a discrete number of operation points.

As stated before, the above described concepts can be employed by video streams, video encoders, video decoders, network nodes, apparatuses for managing the coded picture buffer, CPB, of a video decoder, and apparatuses for splicing together video data streams.

Likewise the concept can be implemented by corresponding methods according to embodiments of the present invention. These methods are based on the same considerations as the above-described video streams, video encoders, video decoders, network nodes, apparatuses for managing the coded picture buffer, CPB, of a video decoder, and/or apparatuses for splicing together video data streams. However, it should be noted that the methods can be supplemented by any of the features, functionalities and details described herein, also with respect to the video streams, video encoders, video decoders, network nodes, apparatuses for managing the coded picture buffer, CPB, of a video decoder, and/or apparatuses for splicing together video data streams. Moreover, the methods can be supplemented by the features, functionalities, and details of the video streams, video encoders, video decoders, network nodes, apparatuses for managing the coded picture buffer, CPB, of a video decoder, and/or apparatuses for splicing together video data streams, both individually and taken in combination.

Finally, also the concept can be used to produce an encoded data stream according to embodiments of the present invention. The data stream can also be supplemented by the features, functionalities, and details of the methods, video encoders, video decoders, network nodes, apparatuses for managing the coded picture buffer, CPB, of a video decoder, and/or apparatuses for splicing together video data streams, both individually and taken in combination.

To conclude, the embodiments described herein can optionally be supplemented by any of the important points or aspects described here. However, it is noted that the important points and aspects described here can either be used individually or in combination and can be introduced into any of the embodiments described herein, both individually and in combination.

Although some aspects have been described in the context of an apparatus, it is clear that these aspects also represent a description of the corresponding method, where a device or a part thereof corresponds to a method step or a feature of a method step. Analogously, aspects described in the context of a method step also represent a description of a corresponding apparatus or part of an apparatus or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any parts of the methods described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for managing a coded picture buffer (CPB) of a video decoder which decodes a video data stream in a manner buffered by the CPB, the apparatus configured to:

determine that a concatenation flag in a buffering period (BP) supplemental enhancement information (SEI) message of a picture portion of the video data stream is set; and responsive to the concatenation flag being set, determine a removal time of the picture portion from the CPB, based on a maximum value of a first removal time and a second removal time, wherein the first removal time is a sum of a removal time of a previous non-discardable picture portion and a lapsed time since removal of the previous non-discardable picture portion, and wherein the second removal time is a sum of a removal time of a last picture portion before concatenation, an initial CPB removal delay of the picture portion, and a difference in time representing a final arrival time of the last picture portion before concatenation minus the removal time of the last picture portion.

2. The apparatus of claim 1, wherein the picture portion, the previous non-discardable picture portion, and the last picture portion are access units.

3. The apparatus of claim 1, wherein the lapsed time since removal of the previous non-discardable picture portion is indicated in the BP SEI message.

4. A method of managing a coded picture buffer (CPB) of a video decoder for decoding a video data stream, the method comprising:

determining that a concatenation flag in a buffering period (BP) supplemental enhancement information (SEI) message of a picture portion of the video data stream is set; and responsive to the concatenation flag being set, determining a removal time of the picture portion from the CPB, based on a maximum value of a first removal time and a second removal time, wherein the first removal time is a sum of a removal time of a previous non-discardable picture portion and a lapsed time since removal of the previous non-discardable picture portion, and wherein the second removal time is a sum of a removal time of a last picture portion before concatenation, an initial CPB removal delay of the picture portion, and a difference in time representing a final arrival time of the last picture portion before concatenation minus the removal time of the last picture portion.

5. The method of claim 4, wherein the picture portion, the previous non-discardable picture portion, and the last picture portion are access units.

6. The method of claim 4, wherein the lapsed time since removal of the previous non-discardable picture portion is indicated in the BP SEI message.

7. A non-transitory computer readable medium comprising instructions, that when executed by at least one processor, cause the at least one processor to manage a coded picture buffer (CPB) of a video decoder by performing the steps of:

determining that a concatenation flag in a buffering period (BP) supplemental enhancement information (SEI) message of a picture portion of a video data stream is set; and responsive to determining that the concatenation flag is set, determining a removal time of the picture portion from the CPB based on a maximum value of a first removal time and a second removal time, wherein the first removal time is a sum of a removal time of a previous non-discardable picture portion and a lapsed time since removal of the previous non-discardable picture portion, and wherein the second removal time is a sum of a removal time of a last picture portion before concatenation, an initial CPB removal delay of the picture portion, and a difference in time representing a final arrival time of the last picture portion before concatenation minus the removal time of the last picture portion.

8. The non-transitory computer readable medium of claim 7, wherein the picture portion, the previous non-discardable picture portion, and the last picture portion are access units.

9. The non-transitory computer readable medium of claim 7, wherein the lapsed time since removal of the previous non-discardable picture portion is indicated in the BP SEI message.

10. A video encoder for encoding a video into a video data stream so that the video data stream comprises a sequence of picture portions, each picture portion having a picture of a video encoded thereinto, wherein the video encoder is configured to:

indicate in a first buffering period (BP) supplemental enhancement information (SEI) message a maximum value for initial removal delay; and indicate in a picture timing SEI message corresponding to a first picture portion of the video data stream a first flag, wherein the first flag equal to one indicates that when the first picture portion is followed by a second picture portion with second BP SEI message with a concatenation flag equal to 1 and an initial removal delay less than the maximum value of the initial removal delay, a nominal coded picture buffer (CPB) removal time applies that is based on an elapsed time since removal of a previous non-discardable picture portion.

11. The video encoder of claim 10, wherein the elapsed time since removal of the previous non-discardable picture portion is indicated in the second BP SEI message.

12. The video encoder of claim 10, wherein the first picture portion, the second picture portion and the previous non-discardable picture portion are access units.

13. A method of encoding a video into a video data stream so that the video data stream comprises a sequence of picture portions, each picture portion having a picture of a video encoded thereinto, the method comprising:

indicating in a first buffering period (BP) supplemental enhancement information (SEI) message a maximum value for initial removal delay; and indicating in a picture timing SEI message corresponding to a first picture portion of the video data stream a first flag, wherein the first flag equal to one indicates that when the first picture portion is followed by a second picture portion with second BP SEI message with a concatenation flag equal to 1 and an initial removal delay less than the maximum value of the initial removal delay, a nominal coded picture buffer (CPB) removal time applies that is based on an elapsed time since removal of a previous non-discardable picture portion.

14. The method of claim 13, wherein the elapsed time since removal of the previous non-discardable picture portion is indicated in the second BP SEI message.

15. The method of claim 13, wherein the first picture portion, the second picture portion and the previous non-discardable picture portion are access units.

16. A non-transitory computer readable medium comprising instructions, that when executed by at least one processor including processing circuitry cause the at least one processor to encode a video into a video data stream so that the video data stream comprises a sequence of picture portions, each picture portion having a picture of a video encoded therein to, by performing the steps of:

indicating in a first buffering period (BP) supplemental enhancement information (SEI) message a maximum value for initial removal delay; and indicating in a picture timing SEI message corresponding to a first picture portion of the video data stream a first flag, wherein the first flag equal to one indicates that when the first picture portion is followed by a second picture portion with second BP SEI message with a concatenation flag equal to 1 and an initial removal delay less than the maximum value of the initial removal delay, a nominal coded picture buffer (CPB) removal time applies that is based on an elapsed time since removal of a previous non-discardable picture portion.

17. The non-transitory computer readable medium of claim 16, wherein the elapsed time since removal of the previous non-discardable picture portion is indicated in the second BP SEI message.

18. The non-transitory computer readable medium of claim 16, wherein the first picture portion, the second picture portion and the previous non-discardable picture portion are access units.

* * * * *